US011906181B2

(12) United States Patent
Zelczer et al.

(10) Patent No.: US 11,906,181 B2
(45) Date of Patent: *Feb. 20, 2024

(54) SYSTEM AND METHOD FOR WIRELESS ENVIRONMENTAL ZONE CONTROL WITH POSITIONING FEEDBACK

(71) Applicant: ARZEL ZONING TECHNOLOGY, INC., Cleveland, OH (US)

(72) Inventors: Al Zelczer, Monsey, NY (US); Leonard Roth, University Heights, OH (US); Richard Wilson, Cleveland, OH (US); Kenneth Barton, Willoughby, OH (US)

(73) Assignee: ARZEL ZONING TECHNOLOGY, INC., Cleveland, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/810,753

(22) Filed: Jul. 5, 2022

(65) Prior Publication Data

US 2022/0341611 A1    Oct. 27, 2022

Related U.S. Application Data

(63) Continuation of application No. 16/491,872, filed as application No. PCT/US2017/021382 on Mar. 8, 2017, now Pat. No. 11,408,623.

(51) Int. Cl.
*F24F 11/30* (2018.01)
*F24F 11/80* (2018.01)
(Continued)

(52) U.S. Cl.
CPC .............. *F24F 11/30* (2018.01); *F24F 11/46* (2018.01); *F24F 11/54* (2018.01); *F24F 11/58* (2018.01);
(Continued)

(58) Field of Classification Search
CPC .. F24F 11/30; F24F 11/46; F24F 11/54; F24F 2140/40
See application file for complete search history.

(56) References Cited

U.S. PATENT DOCUMENTS 1,142,553 A * 6/1915 Colin ................. G05D 23/2754
236/78 A
2,999,640 A   9/1961 Waterfill
(Continued)

FOREIGN PATENT DOCUMENTS

| EP | 2846103 A1 | 3/2015 |
| GB | 2297156 A1 | 7/1996 |
| KR | 10-0587192 A1 | 8/2001 |

OTHER PUBLICATIONS

International Search Report and Written Opinion for International Application No. PCT/US2017/021382 dated May 25, 2017. Lee W. Young, authorized officer. Forms PCT/ISA/220, PCT/ISA/210, and PCT/ISA/237.

(Continued)

*Primary Examiner* — Mohammad Ali
*Assistant Examiner* — Vincent W Chang
(74) *Attorney, Agent, or Firm* — Vorys, Sater, Seymour and Pease LLP; Mark A. Watkins

(57) ABSTRACT

A system and method to control environmental parameters of predefined zones within a structure. An embodiment of the system uses damper assemblies that are entirely wireless as a result of energy capturing devices which convert air flow within the HVAC system ductwork into electrical current and a wireless control module that remove the need for hard-wiring for power or control. Still further, an embodiment of the system uses wireless components to monitor the environmental parameters of a structure's zones, process and communicate necessary zone adjustments, and actuate system components.

17 Claims, 12 Drawing Sheets

(51) Int. Cl.

| | | |
|---|---|---|
| *F24F 11/64* | (2018.01) | |
| *F24F 11/46* | (2018.01) | |
| *F24F 11/72* | (2018.01) | |
| *F24F 11/54* | (2018.01) | |
| *F24F 11/58* | (2018.01) | |
| *F24F 12/00* | (2006.01) | |
| *F24F 13/14* | (2006.01) | |
| *G05B 15/02* | (2006.01) | |
| *F24F 140/40* | (2018.01) | |
| *F24F 110/10* | (2018.01) | |

(52) U.S. Cl.
CPC .............. *F24F 11/64* (2018.01); *F24F 11/72* (2018.01); *F24F 11/80* (2018.01); *F24F 12/00* (2013.01); *F24F 13/1426* (2013.01); *G05B 15/02* (2013.01); *F24F 2110/10* (2018.01); *F24F 2140/40* (2018.01)

(56) References Cited

U.S. PATENT DOCUMENTS

| | | | | |
|---|---|---|---|---|
| 5,251,815 | A * | 10/1993 | Foye | F24F 13/06 |
| | | | | 236/51 |
| 5,458,148 | A * | 10/1995 | Zelczer | F16K 1/221 |
| | | | | 137/315.04 |
| 7,354,005 | B2 | 4/2008 | Carey et al. | |
| 10,113,765 | B1 * | 10/2018 | May | F24F 11/74 |
| 11,260,945 | B1 * | 3/2022 | Patterson | B63H 1/20 |
| 2005/0048911 | A1 * | 3/2005 | Mrozek | F24F 11/74 |
| | | | | 454/335 |
| 2006/0286918 | A1 * | 12/2006 | Vargas | F24F 13/06 |
| | | | | 454/155 |
| 2007/0087681 | A1 * | 4/2007 | Cook | F24F 11/74 |
| | | | | 454/256 |
| 2007/0119958 | A1 | 5/2007 | Kates | |
| 2012/0100797 | A1 | 4/2012 | Vogel et al. | |
| 2013/0328277 | A1 * | 12/2013 | Ryan | B60G 17/0165 |
| | | | | 280/5.519 |
| 2014/0222241 | A1 * | 8/2014 | Ols | F24F 11/70 |
| | | | | 700/299 |
| 2015/0369507 | A1 | 12/2015 | Flaherty et al. | |
| 2016/0258639 | A1 | 9/2016 | Wiley et al. | |
| 2016/0348930 | A1 | 12/2016 | Mirante | |

OTHER PUBLICATIONS

"Venturi Air Valve or Single-Blade Damper What's Right for You" (SIEMENS) Sep. 2008 technology report accessed Apr. 25, 2017 at https://w3.usa.siemens.com/buildingtechnologies/us/en/consulting-engineer/engineeradvatage/Documents/venturi-air-valve-or-blad-damper.pdf, entire document—8 pages.

Non-Final Office Action for U.S. Appl. No. 16/491,872 dated Dec. 15, 2021, 40 pages.

European Search Report for International Application No. PCT/US2017/021382 dated May 12, 2021, 4 pages.

* cited by examiner

SYSTEM AND METHOD FOR WIRELESS ENVIRONMENTAL ZONE CONTROL WITH POSITIONING FEEDBACK

This Patent Application is a continuation of U.S. patent application Ser. No. 16/491,872 filed Sep. 9, 2019, which claims priority to and the benefit of International Patent Application No. PCT/US2017/021382 having an International filing date of Mar. 8, 2017, each is incorporated by reference herein in its entirety.

TECHNICAL FIELD

Certain embodiments of the present invention relate to HVAC zoning. More particularly, certain embodiments of the present invention relate to a system and method to control environmental parameters of predefined zones within an environment.

BACKGROUND

The cooling and heating of commercial buildings and residential homes is typically accomplished via forced air and forced hot or cooled water distribution systems. A furnace, heat pump, other fossil fuel furnace, and/or air conditioner are typically used to supply heated air or cooled air to areas of the building or home via ducts. Such distribution systems are often controlled by a single thermostat which is centrally located within the building or home. A person sets the thermostat to a particular temperature setting. When the temperature measured by the thermostat deviates a predefined amount from the set temperature, a furnace, heat pump, other fossil fuel furnace, or air conditioner is turned on to provide heated or cooled air or water to the various regions of the building or home via the duct work or water lines.

Even though the desired temperature may be achieved at the location of the thermostat, the resultant temperatures in the various other regions of the building or home may still deviate quite a bit from this desired temperature. Therefore, a single centrally located thermostat may not provide adequate temperature control for individual rooms and areas. In an attempt to address this problem, duct work and pipes throughout the building or home are fitted with manually adjustable registers, dampers, or valves which help to control the flow of air or water to the various regions.

A damper, which may generally be a valve or plate that stops or regulates the flow of air inside a duct, chimney, variable air volume box, air handler, or other air handling equipment, can utilize manual or automatic functions to shut off or restrict the flow of air into various rooms in order to regulate its temperature and climate. Manual dampers and valves are typically each adjusted to a single position and left in that state. Such an adjustment may be sufficient for a particular time of year, outside temperature level, and humidity level, but is likely not optimal for most other times of the year and other temperature and humidity levels. Furthermore, such an adjustment may only be suitable for a particular time of day due to the internal and external daily load variances that occur depending on, for example, the position of the sun, whether or not lights are on, and how many people are in a particular area. Moreover, it may be time consuming and difficult to manually re-adjust the dampers and valves for optimal comfort level. Dampers actuated by electric motors or pneumatic components are a recent industry development which relieve homeowners of manual damper adjustments, but they may also require the installation of expensive and complex wiring, and/or pressurized air lines, to power sources and thermostats.

The complexity of damper flow control systems continues to increase as the industry has developed multi-zone control systems in an attempt to better control the environmental parameters in each room or region of a home or building, for example, by placing thermostats and/or sensors in each room or groups of rooms. A zone may be equipped with a temperature, humidity, motion, or other sensor in communication with a central thermostat or thermostat located in the zone. When the temperature falls outside of the defined acceptable range, the thermostat or sensor triggers actuation of the heating or cooling source, and/or movement of the dampers, until the zone once again achieves the desired temperature.

However, such systems are not entirely successful since a structure with multiple rooms and zones requires the installation of highly complex wiring systems, and/or pneumatic air lines, in order to provide power and control signals to the thermostats, sensors, and/or dampers. Specifically, the expense of the required wiring or air lines, its installation, and the utility bills associated with powering associated dampers, sensors, and thermostats can be cost prohibitive. Retrofit installation of wiring systems can be particularly difficult and expensive.

Moreover, known climate control systems are typically controlled by a centralized thermostat which is hardwired to a single location. This centralized thermostat, in turn, is hardwired to a power source and all dampers associated with the climate control system. Thus, a person desiring a change in temperature must physically move to the centralized thermostat in order to enter temperature control instructions.

In view of the foregoing discussion, it is apparent that there is a need for a more efficient way of controlling the distribution of air or water and environmental parameters for several zones in a building or home.

Further limitations and disadvantages of conventional, traditional, and proposed approaches will become apparent to one of skill in the art, through comparison of such systems and methods with the system and method as set forth in the remainder of the present application with reference to the drawings.

SUMMARY

In one example embodiment, a system to wirelessly control environmental parameters of a predefined zone is disclosed. The system includes a damper associated with the zone and configured to regulate the flow of air inside an air duct of the zone. The damper includes an optional wireless energy harvesting device adapted to capture energy in an HVAC conduit. The damper further includes an energy storage device adapted to store energy captured by the energy harvesting device. The damper assembly is configured to operate using energy generated by the energy harvesting device. The system further includes a temperature controller associated with the damper, configured to monitor the temperature in the zone, to receive as input a desired temperature for the zone, and to communicate data representative of the zone temperature and the desired temperature and to request service at the zone. The system further includes a control box in wireless communication with the damper assembly and the temperature controller, the control box configured to adjust the positon of the damper to regulate the flow of air inside the air duct of the zone based on the data representative of the zone temperature and the desired temperature received from the temperature controller.

In one example embodiment, a damper for an HVAC system is disclosed. The damper includes a rail assembly for providing support to the damper and for securing and sealing the damper on an air duct. The damper further includes a damper blade assembly configured to regulate the amount of air passing through an air duct. The damper further includes a damper module configured to control the orientation of the damper blade assembly. The damper further includes an optional scavenger assembly configured to harvest energy from air passing by the damper inside the air duct. The damper further includes an energy module configured to store energy harvested by the scavenger assembly.

In one example embodiment, a method for wirelessly controlling environmental parameters of a predefined zone is disclosed. The method includes the step of providing a control box, a wireless temperature controller associated with the zone, and a damper assembly associated with the zone, the damper including a wireless energy harvesting device, an energy storage device, and a module for actuating damper assembly operation. The method further includes the step of collecting data representative of the environmental parameters of the zone and data representative of desired temperature for the zone via the wireless temperature controller. The method further includes the step of wirelessly transmitting the collected data from the wireless temperature controller to the control box. The method further includes the step of processing the collected data to determine a corresponding control signal. The method further includes the step of wirelessly transmitting the control signal from the control box to the damper assembly. The method further includes the step of actuating damper assembly operation, in response to the control signal, using energy generated by the energy harvesting device.

The systems and methods described herein permit wireless control of HVAC systems via various wireless communications devices. The disclosure also provides for an HVAC system that utilizes "green energy" damper assemblies which convert air flow generated within routine operation into electrical power that powers various system components.

These and other advantages and novel features of the present disclosure, as well as details of illustrated embodiments thereof, will be more fully understood from the following description and drawings.

DETAILED DESCRIPTION

Described herein is a customizable system for wirelessly controlling environmental parameters of predefined zones. The system combines temperature data with predefined zone parameters to determine how much air to deliver to a zone and when to deliver air to a zone. It should be appreciate that, although the system is described herein with respect to forced air systems, the system may also be applied to water distribution systems for heating and cooling. It should be appreciated that, although temperature measurements are referenced through the description, other suitable parameters such as humidity may also be measured and monitored.

Figure 1:
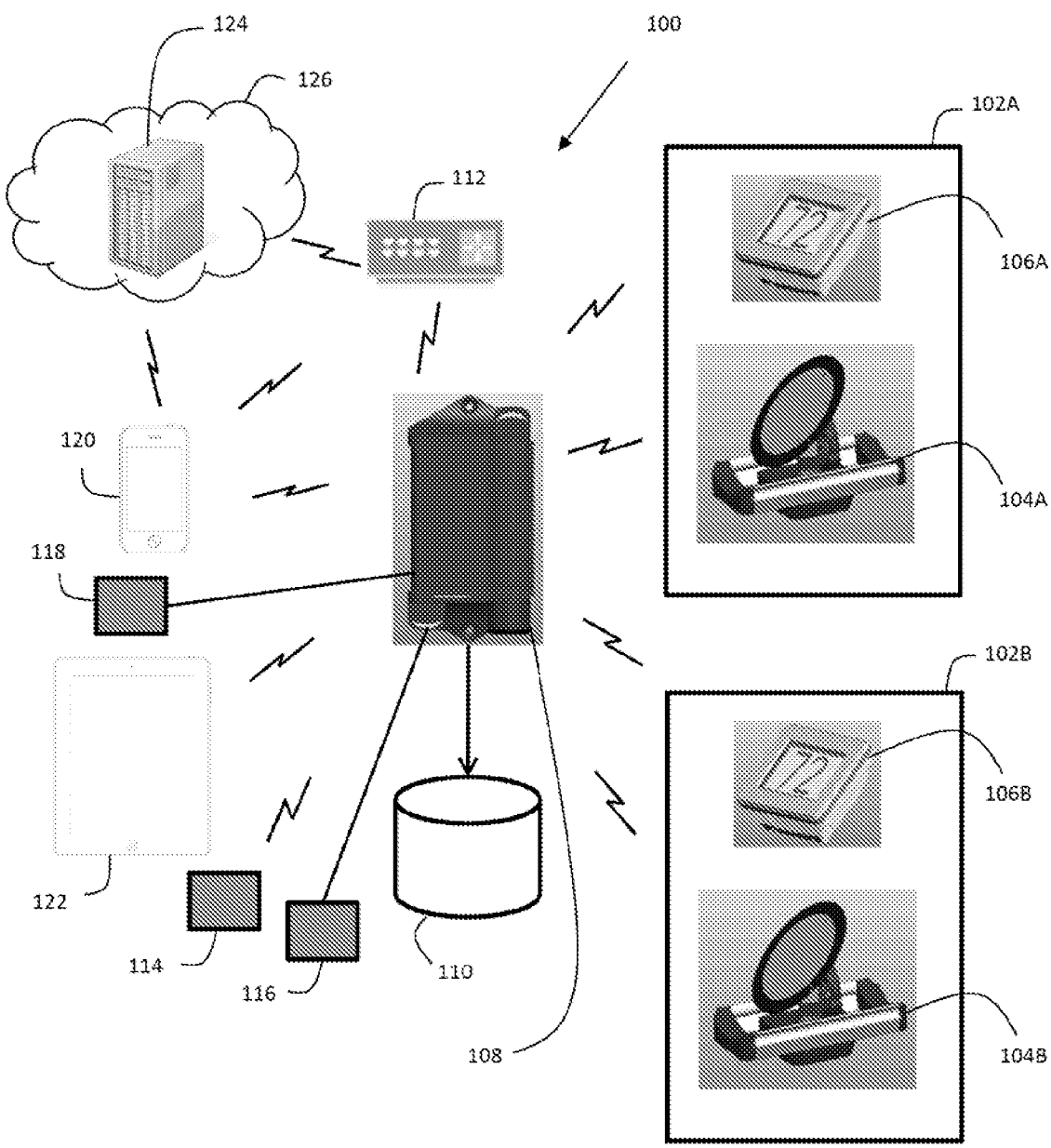
FIG. 1 illustrates a schematic block diagram of an example embodiment of a system to wirelessly control environmental parameters of predefined zones within an environment.

FIG. 1 illustrates a schematic block diagram of an example embodiment of a system 100 to wirelessly control environmental parameters of predefined zones 102A and 102B (hereinafter referred to as "zone" or "zones" 102") within a first environment, in accordance with various aspects of the present disclosure. A zone 102 may comprise a portion of a large room, a separate room, or other connected areas in a house or other building, for example. A zone 102 may also be defined by a time of day. For example, a bedroom zone 102 may only be dynamically controlled at night when the bedroom is in use, and left closed off during the day when the bedroom is not in use. Similarly, an office building or restaurant not used at night may be closed off at certain hours of the night and dynamically controlled during the day. It should be appreciated that although the example system 100 is illustrated to wirelessly control environmental parameters of a first predefined zone 102A and a second predefined zone 102B, the example system 100 can be configured to wirelessly control any suitable number of zones 102.

It should be appreciated that controlling temperatures in a configurable zone may be additionally advantageous in that static pressure buildup may be preventable. In particular, to prevent static buildup in a room, a zone may be configured in such a way as to prevent a certain group or groups of dampers from all being closed at the same time, which may otherwise result in static pressure buildup if they were all closed at the same time.

The system 100 further includes at least one wireless air damper 104A and 104B associated with each of the zones 102A and 102B respectively (hereinafter referred to as "damper" or "dampers" 104). The damper 104 is configured to regulate the flow of air inside an air duct of an associated zone 102.

In accordance with various embodiments of the present disclosure, the damper 104 may be a wireless damper that is powered by an energy capture device in combination with an associated rechargeable energy storage device (not shown). The damper 104 may be electromechanical, pneumatic, or any other type of suitable damper.

The system 100 further includes temperature controllers 106A and 106B associated with each of the zones 102A and 102B respectively (hereinafter referred to as "temperature controller" or "temperature controllers" 106). The temperature controllers 106 serve as user interfaces capable of setting a temperature in a corresponding zone 102. Thus, a first temperature controller 106A may be configured to provide an interface for adjusting the temperature in a first zone 102A while a second temperature controller 106B may be configured to provide an interface for adjusting the temperature in a second zone 102B. In one example, temperature controllers 106 are portable and wireless and therefore may be moved according to user needs. For example, a user may move the temperature controller 106 to a couch while watching TV to enable the user to adjust the temperature in the zone 102 while watching TV. Thus, the temperature controller 106 may monitor, and in turn control, the temperature near the user in particular instead of a fix location in a room or zone. In another example, a user may move the temperature controller 106 to a fixed location within the zone 102 while away from the zone 102. In one example, the temperature controller 106 may be configured to be mountable on a wall or otherwise secured to a fixed location within the zone 102.

Figure 2A:
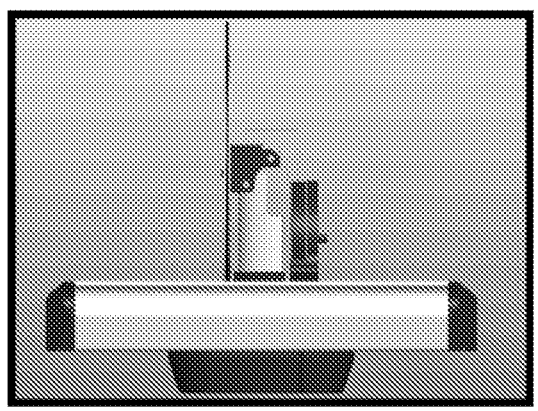
FIG. 2A illustrates an example damper of FIG. 1.
Figure 2B:
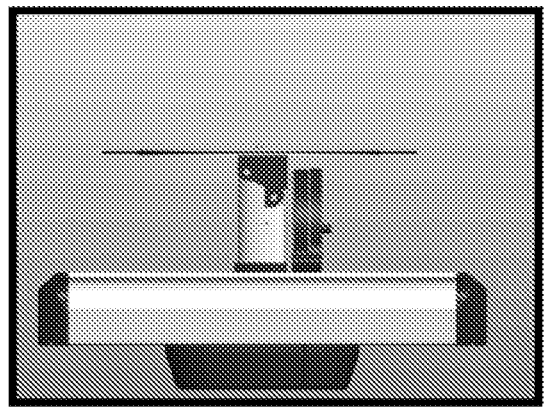
FIG. 2B illustrates an example damper of FIG. 1.

The temperature controller 106 is configured to monitor the temperature in a zone and to display the temperature via an interface and also to receive input from a user about desired temperature. Desired input may be input, for example, via an interface at the temperature controller 106. It should be appreciated that the user may also input a desired temperature via an alternative interface such as a remote computing device. The temperature controller 106 is operatively connected to a control box 108 and configured to wirelessly communicate the zone temperature and desired temperature to the control box 108 and to request service at the zone 102. For example, zone service may include any of a heating call, a cooling call, a humidification call, a dehumidification call, and a fan-only call, in accordance with an embodiment of the present disclosure. The control box 108 is further operatively coupled to the damper 104 and configured to adjust the positon of the damper 104 based on the received information from the temperature controller 106. For example, the damper 104 may be adjusted a fully closed position 202, as illustrated in FIG. 2A, in order to block all or a majority of air from passing through inside a duct, or the damper 104 may be adjusted to a fully open positon 204, as illustrated in FIG. 2B, in order to allow the maximum amount of air to pass through inside the duct.

Figure 2C:
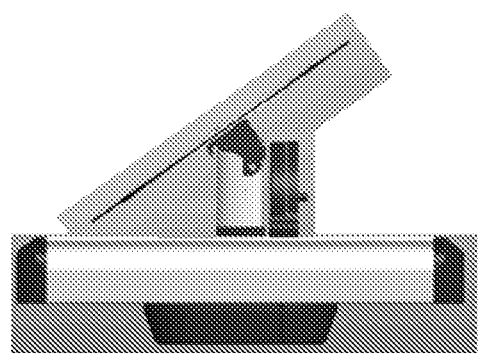
FIG. 2C illustrates an example damper of FIG. 1

In one example, the system 100 may include a positioning feedback system (described in more detail below) in order to determine the current position of the damper 104. Using the positioning feedback system, the damper 104 may be adjusted to partially opened positions, as illustrated in FIG. 2C, in order to regulate the amount of air allowed to pass through. For example, it may be desirable or most efficient for the damper 104 to allow some portion of air flow, less than the maximum amount of air flow, to pass through in order to obtain or maintain a desired temperature in a zone. Thus, the temperature controller 106 may adjust the damper 104 to open to a position, in between a fully opened position and a fully closed position, as determined by the temperature controller 106 to be most efficient for obtaining or maintaining the desired temperature. In one example, the temperature controller 106 may automatically adjust the damper 104 position in order to obtain and maintain a desired temperature. For example, the temperature controller 106 may automatically adjust the damper 104 to a first partially open position in order for a zone to reach a desired temperature and then adjust the damper 104 to a second partially open position in order for the zone to maintain the desired temperature. The automatic adjustment may be made based on a determined temperature, for example, and comparing the determined temperature to the desired temperature. In another example, the automatic position adjustment may be made based on determined relative or measured state pressure.

Once a desired temperature in a zone associated with the temperature controller 106 is reached, the temperature controller 106 may communicate such information to the control box 108 so that the control box 108 may in turn adjust the damper 104 position accordingly if necessary. In one example, the control box 108 may determine that the system 100 may be experiencing a problem if a measured temperature at a temperature controller is not reaching a desired temperature and inform a homeowner or a contractor of the potential problem. For example, if a temperature controller 106 is broken or removed from an associated zone, it will not be able to accurately measure the temperature in its assigned zone. In such a scenario, the control box 108 may notify a homeowner of the problem and also either automatically close and/or open the damper 104 associated with the assigned zone where a problem is detected or rely on a wired backup temperature sensor to determine when to close the damper 104.

The control box 108, at the heart of the system 100, may be hardwired into a centralized location, or be of a portable wireless variety as described herein. In one example, the control box 108 may be configured as a micro access point or a Wi-Fi station, which may result in cost savings since a separate wireless access point 112 may not be required. In one example, the outer shell of the control box 108 is comprised of a suitable combination metal or other durable material to prevent damage to the inner components of the control box 108 as well as injection molded plastic to limit wireless signal attenuation. In one example, the control box 108 may be configured to be opened up in order to allow access to the inside of the control box 108 for maintenance and repair purposes.

Referring back to FIG. 1, the control box 108 is further communicatively coupled to one or more components associated with heating and cooling ("HVAC") equipment 110 such a heat pump, a furnace, a refrigeration evaporator, an electric resistance heater, or other suitable auxiliary components and equipment. The control box 108 is operationally connected to the HVAC equipment 110 via a relay connector or other suitable wired or wireless connector such that the control box 108 is configured to control the HVAC equipment 110.

System 100 further may include a wireless outdoor temperature sensor (hereinafter referred to as "OA Sensor") 114 and a wireless leaving air temperature sensor (hereinafter referred to as "LAT") 116 in communication with the control box 108. The OA sensor 114 and LAT 116 provide temperature data to control box 108 for optimizing the closed loop transfer functions of the complete HVAC installation, as well for protecting the system 100 from overheating or freezing. The system 100 may further include a wired failsafe temperature sensor 118 in communication with the control box 108 and configured to provide the control box 108 with ambient indoor temperature data in the event of a wireless connectivity problem which would protect the system 100 from overheating and freezing. In another example, a return air temperature may be used as an approximation of the ambient indoor temperature. In one example, the OA sensor 114 and LAT 116 help provide protection against equipment heating high limit and cooling low limit. In one example, the OA sensor 114 and LAT 116 assist in duel fuel balancing and equipment staging.

The system 100 further includes a homeowner computing device 120 configured to enable a user or homeowner to wirelessly access the control box 108 and to control the system 100, either directly while at home and within range of the control box 108, or remotely while away from home by connecting to the home wireless access point 112, via the Internet 126. The system 100 further includes an administrator computing device 122 configured to enable a contractor or other suitable systems administrator to wirelessly access the control box 108 and to perform initial setup and future troubleshooting and maintenance of system 100. In one example, administrator computing device 122, is restricted to only accessing the control box 108 while at the home and connected to the system's 100 wireless network, which is distinct from a home's wireless network. This restricts the administrator's access and does not require granting of access to a home's wireless network to the administrator. In another example, the administrator computing device 122 may be granted access to the control box 108 remotely as well, either directly via a cellular network of control box 108 or via a secure connection through a home's router.

It should be appreciated that the homeowner computing device 120 and the administrator computing device 122 may be any suitable computing device such as a hard-wired desktop or laptop personal computer or a portable wireless electronic device—such as a mobile phone, laptop computer, and/or tablet computer—utilizing a software application (cloud, website, and/or device based) configured to monitor and respond to environmental factors received from the system 100. The homeowner computing device 120 and the administrator computing device 122 may consist of dedicated software and can operate on computers utilizing Windows™, Mac™, Linux,™ or any other operating system and may use a private intranet or public website to access the network. The administrator computing device in particular 122 may be used by an installation worker during configuration and HVAC system setup while the homeowner computing device may provide users with information about zone environmental conditions and HVAC system status and permit users to request changes to environmental conditions in one or more zones in the structure through an interface system.

In some embodiments, other home or building automation devices—such as security, lighting, curtains, blinds, or other functions—may be controlled via the homeowner computing device 120 and the administrator computing device 122.

System 100 further includes a remote computer data server 124 in the cloud, accessible via the Internet 126. The computer data server 124 is configured to receive and store data from the control box 108. For example, the computer data server 124 may store data relating to the HVAC usage of a homeowner. Such data may be beneficial for analyzing trends and making recommendations to the homeowner. In one example, the computer data server 124 may further be configured to perform such calculations and analysis based on received data and to provide recommendations or other suitable reports to the homeowner or to other authorized parties. In one example, only the homeowner computing device 120 may be configured to access the data stored by the computer data server 124 while in other examples, other suitable computing devices may be granted access to the stored data. In one example, the computer data server 124 may further be configured to be capable of communicating alerts or messages to the homeowner computing device 120, if for example the system 100 is malfunctioning or with other suitable information.

It should be appreciated that network communication between the components of system 100 can occur via analog or digital signals, with or without the use of a master or coordinator, and can create relationships that can include master/slave, peer-to-peer, or a combination of both. In addition, although specific components of system 100 have been described herein, it is to be understood that the number and arrangement of such system 100 components can be capped or scalable, that interoperability between components may or may not require bridging hardware, and that the network may be publicly or privately shared within a variable geometric spatial scope but may or may not communicate with other networks.

Figure 3:
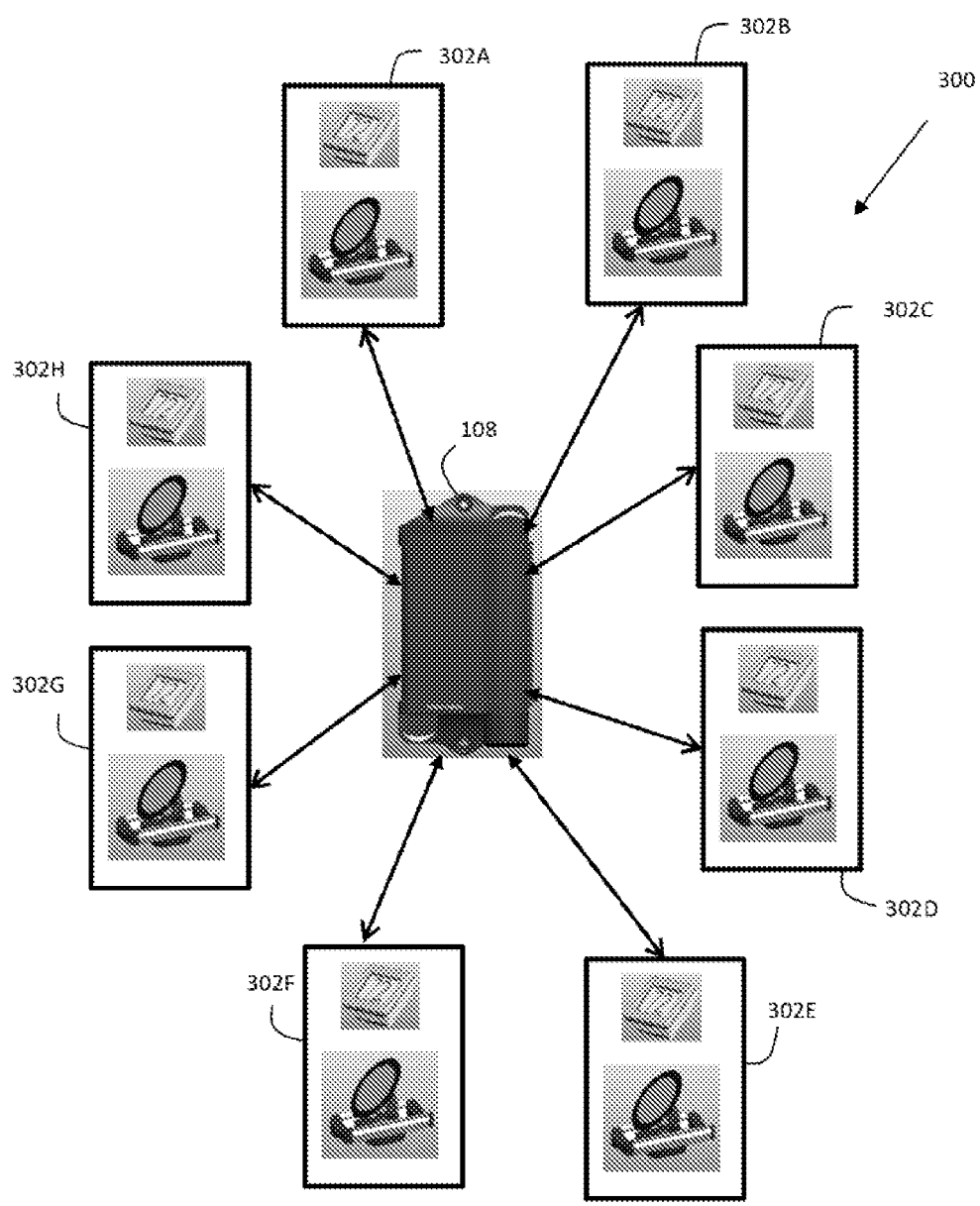
FIG. 3 illustrates the example system of FIG. 1 configured in a star topology.

It should be further appreciated that the network topology for the system 100 communication control system may consist of various combinations of wired and/or wireless mediums. For wired connections, the control box 108 may transfer communications over, by way of non-limiting examples, twisted pair, coaxial, fiber optic, or ITU-T G.hn components, and may be interoperable with other networks via a gateway using BACnet or LonTalk protocols. For wireless connections, communications may occur, again by way of non-limiting example, via open or proprietary satellite, cellular, radio, infrared and/or other wireless personal area network protocols such as ZigBee™ Bluetooth™, Wi-Fi, Z-Wave™ or EnOcean™. The topological layout may be open (i.e., Mesh™ or Star™) as with the geographical scale (i.e., LAN, PAN, WAN). FIG. 3 illustrates one example in which the control box 108 is configured to control multiple zones 302A-H by communicating with respective dampers and temperature controllers in each of the zones 302A-H in a star topology. Such a start topology may be beneficial in that the control box 108 may communicate directly with each of the zones 302A-H. Thus, the control box 108 is having difficulty communicating with a first zone, such a malfunction will not interfere with the control box's 108 ability to communicate with the remaining zones. It should be understood that numerous combinations of wired and wireless system arrangements are contemplated to fall within the scope of this disclosure.

In one example, the control box 108 is configured to control a subset of dampers 104 based damper 104 associations with the multiple zones 302A-H.

In various embodiments of the present disclosure, portions, or all of, the system 100 equipment are controlled via wireless communications. In one embodiment particularly suited for retrofitting an existing HVAC system with an at least partially wireless control configuration, the control box 108 is hard-wired into a centralized location but also operationally connected to home router and access point 112. In another embodiment, the control box 108 may have integrated wireless communications components adapted to communicate wirelessly with other components of system 100 without requiring connection to or interference with a home wireless network.

Figure 4:
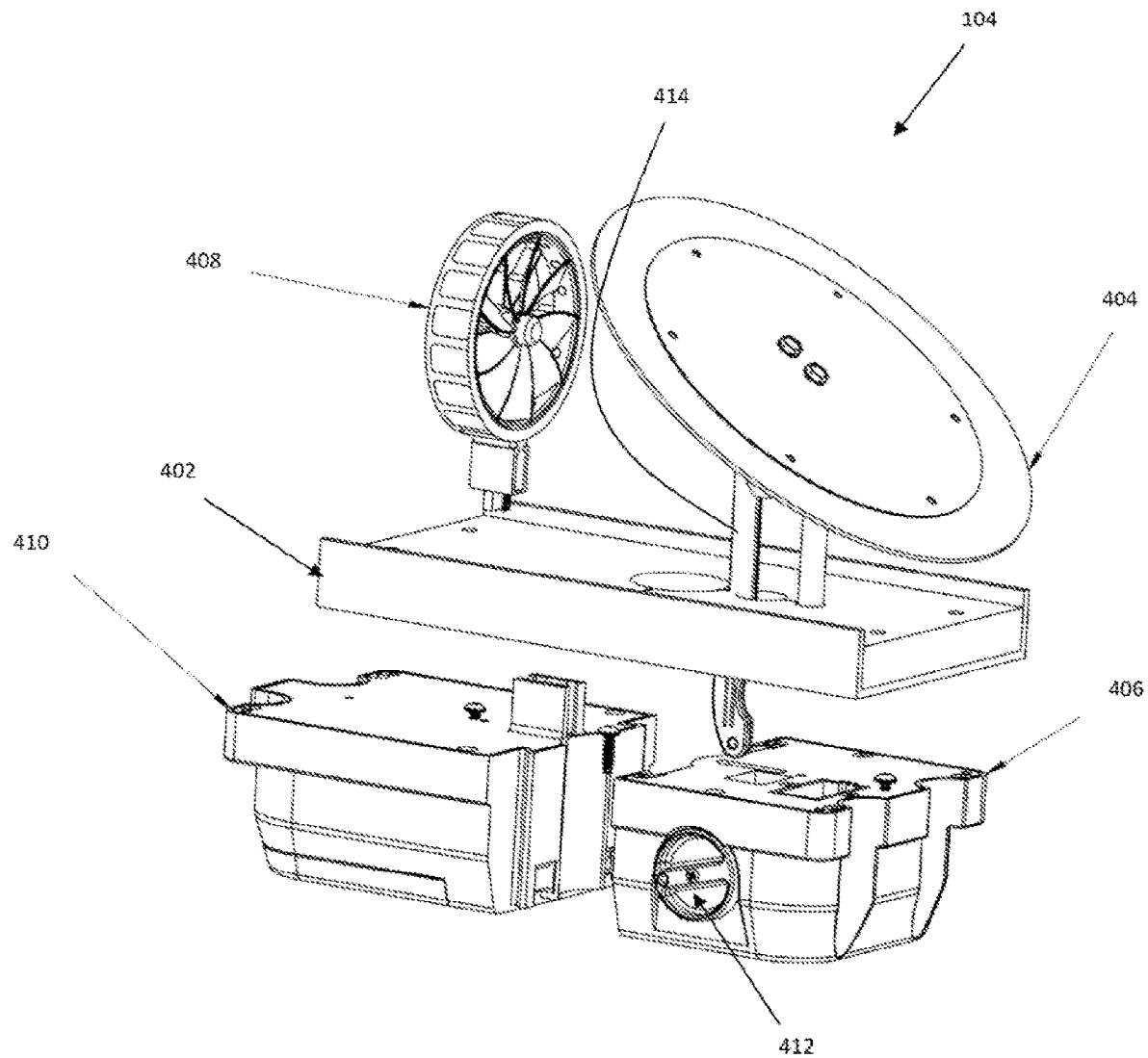
FIG. 4 illustrates an example damper of FIG. 1.

FIG. 4 illustrates an example damper 104 in more detail. Damper 104 includes a rail assembly 402 for providing support to the damper 104 and for securing and sealing the damper on an air duct. The damper 104 further includes a damper blade assembly 404 configured to regulate the amount of air passing through an air duct. In particular, the damper blade assembly 404 prevents substantially all or a portion of air flowing inside an air duct to pass through, depending on the damper blade assembly 404 orientation. The damper 104 further includes a damper module 406 configured to control the orientation of the damper blade assembly 404. In particular, the damper module 406 is configured to communicate with the control box 108 and to open and close the damper blade assembly 404 based on received instructions from the control box 108.

In one example, the damper module 406 is able to determine the positon of the damper blade assembly 404 based on the amount of power being drawn by a motor to open and close the damper blade assembly 404. For example, a motor may require more energy to move the damper blade assembly 404 from a completely open state to a partially open state as compared to the amount of energy that may be required to move the damper blade assembly 404 from a partially open state to a closed state. Thus, the damper module 406 may translate the required energy into an approximation of the current state of the damper blade assembly 404.

In one example, an encoder is used to determine the current position of the damper blade assembly 404. It should be appreciated that other suitable feedback devices such as proximity sensors and limit switches may be used for detecting the current position of the damper blade assembly 404. In one example, the damper module 406 includes a positioning feedback system, as will be described in more detail below, for detecting the current position of the damper blade assembly 404.

In one example, the damper module 406 includes a crank and rod mechanism 414 for rotating the damper blade assembly 404 between various open, closed, and in-between positions. The crank and rod mechanism 414 may be advantageous over other types of mechanisms in that it may enable the damper blade assembly 404 to be moved into various positions at a faster rate as compared to alternative mechanisms, such as a screw and rod mechanism or a typical mechanical gear box. In addition, the crank and rod mechanism 414 may be more cost effective to manufacture as compared to alternative mechanisms.

The damper 104 is further configured to generate and store its own power but also rely on a battery power source or an external hard wired source when needed. Thus, the damper 104 further includes an optional scavenger assembly 408 for harvesting energy from the air that passes by the damper 104 inside the air duct. In particular, the scavenger assembly 408 includes an impeller that rotates as air passes by. The rotation of the impeller in the scavenger assembly 408 is translated into energy and stored by the scavenger module 410. It should be appreciated that other suitable energy harvesting techniques may be used in place of a rotating impeller. It should further be appreciated that an energy harvesting may supplement energy requirements rather than providing all of required energy. In one example, the scavenger assembly 408 or the scavenger module 410 may be optional and removable.

In one example, the scavenger assembly 408 may consist of a wind-turbine type device that comprises one or more of a blade, rotor, shaft, pitch system, gear box, and generator to turn wind forces into wind-generated electrical power. In one example, the scavenger assembly 408 may have blades that are spoon shaped or airfoil propeller shaped. In one example, the scavenger assembly 408 may arrange turbine components on a vertical or horizontal axis in the form of upwind, downwind, shrouded, Savonius, flapping panel, or Darrieus or Giromill type devices. In one example, the scavenger assembly 408 may utilize gearless or reduction-geared gear assemblies. In one example, the scavenger assembly 408 may use electromagnetic induction. In other embodiments, the scavenger assembly 408 may use movement or pressure within system ductwork to capture energy for storage by the scavenger module 410. In still other embodiments, the scavenger module 410 may be recharged via the scavenger assembly 408 using thermally driven (thermoelectric), solar-powered (photovoltaic solar cells; concentrated solar power in the form of a Fresnel reflector, stirring dish, power tower, or other solar powering arrangements known in the art), radio scavenging, or rectenna/nantenna type harvesting technologies. In one example, the scavenger assembly 408 includes piezoelectric material for generating electric power via the mechanical stress or vibration generated by the damper 104.

In the event that the scavenger module 410 does not have enough stored energy generated from the scavenger assembly 408, the scavenger module includes a battery backup which can be used to power the damper 104. The battery may be of various combinations of chemicals such as alkaline, lead-acid, nickel cadmium, nickel metal hydride, nickel iron, nickel hydrogen, nickel zinc, lithium ion, lithium ion polymers, lithium-air, lithium cobalt oxide, lithium iron phosphate, lithium sulfur, lithium titanate, sodium ion, thin film lithium, zinc bromide, vanadium redox, sodium-sulfur, molten salt, silver-oxide, or oxide semiconductors. In one example, the battery may be rechargeable.

In one example, the scavenger module 410 may be configured to operate the damper 104 in one of three modes depending on how much energy has been generated by the scavenger assembly 408 and stored and how much energy is currently being generated. For example, in a first mode, the scavenger module 410 may operate the damper 104 in a full energy scavenging mode, meaning the damper 104 is only being powered by energy being harvested by the scavenger assembly 408 or energy stored by the scavenger module 410 that was previously generated by the scavenger assembly 408. In this mode, the airspeed must meet a minimum predefined rate. For example, the airspeed may need to be at least 600 feet/minute for the scavenger module 410 to operate in the first mode. Air speed may be determined, by example, with a velocity sensor or a hand-held anemometer. In a second mode, the scavenger module 410 may operate the damper 104 in battery mode, meaning the damper 104 is powered entirely using the battery backup. This mode may be required if the air speed drops below a predefined threshold. For example, the scavenger module 410 may operate in battery mode when airspeed drops below 200 feet/minute. In a third mode, when the airspeed in the air duct is above the battery power mode threshold but below the full energy scavenging mode, the scavenger module 410 may operate the damper 104 in a hybrid mode using a combination of power from the battery backup and power generated by the scavenger assembly 408. In one example, the functionality of a damper 104 may be limited or restricted while operating in battery power mode or in hybrid mode. For example, while a damper 104 may function as a wireless router to facilitate wireless communication within system 100, the damper 104 may be restricted to an end device only when operating in battery power mode. It should be appreciated that the scavenger module 410 may be configured to operate in other suitable modes using various combinations of energy sources. For example, a fourth mode may include operating using an external hardwired energy source.

In one example, the impeller of the scavenger assembly 408 may function as an anemometer for determining actual speed of air passing through the air duct. The scavenger module 410 may be configured to store this information and communicate the information to the control box 108. In one example, the determined air speed may be used to select an operating power mode.

In one example, the energy generated by the scavenger assembly 408 may also provide power to the system control box 108, or other components of system 100. It should be appreciated that energy generated by the scavenger assembly 408 may also be used to power suitable components outside of the system 100. For example, the generated energy may be sued to power a UV light for bacteria cleansing.

It should be appreciated that the damper 104 may be of different types such as, for example, hydraulic, an electric damper driven by an electric motor that can be wirelessly activated or a pump that may be activated by wireless control signals to provide pneumatic pressure that opens and closes the damper 104.

It should be appreciated that the disclosure should not be limited to any particular damper assembly arrangement. Rather, any damper 104 that is capable of sealing or otherwise restricting air flow through an HVAC ductwork or air flow enclosure is intended to fall within the scope of the following arrangements. By way of non-limiting examples, mechanical power and transmission for damper operations may use solenoids and an air piston, bladder, diaphragm, or electrical motor with a gear box, for example. Linkage for mechanical transmissions may also consist of belts and pulleys, an axle, or a linear actuator. It should be further appreciated that the impeller of the scavenger assembly 408 may be of any shape chosen by a person of sound engineering judgment, including but not limited to round, oval, triangular, rectangular, pentagonal, or hexagonal. The shape of the blade may be accomplished by foldable or expandable movement.

In a preferred embodiment, the damper 104 is of a wireless configuration, in that it does not require conventional wiring to the structure's central electrical system and does not need to be hardwired into control box 108 in order to receive control communications.

In other embodiments of the invention, the damper module 406 may also be adapted to receive and/or process wireless control signals forwarded from the temperature controller 102 or the control box 108. Control signals received by the damper module 406 may prompt a request for transmission of power contained in the scavenger module 410 that is sufficient to actuate the damper blade assembly 404 to open or close, to varying degrees, depending on the amount of air flow required to bring a zone within desired environmental temperature or humidity ranges. The damper module 406 may optionally terminate actuation of the damper blade assembly 404 when control signals received indicate desired environmental conditions have been achieved.

It should be appreciated that an existing HVAC system may be retrofitted for wireless control of zone heating and cooling using the system 100 described herein. In particular, the damper 104 may be adapted to be retrofitted into existing ductwork. It should be further appreciated that in some instances, installation of the damper 104 may require portions of the ductwork to be removed while in other embodiments, the damper 104 may be inserted through an unmodified ductwork and/or register boot. The system 100 may also be suitable for new construction homes and buildings where the HVAC system may be designed to work with the system 100.

Figure 5:
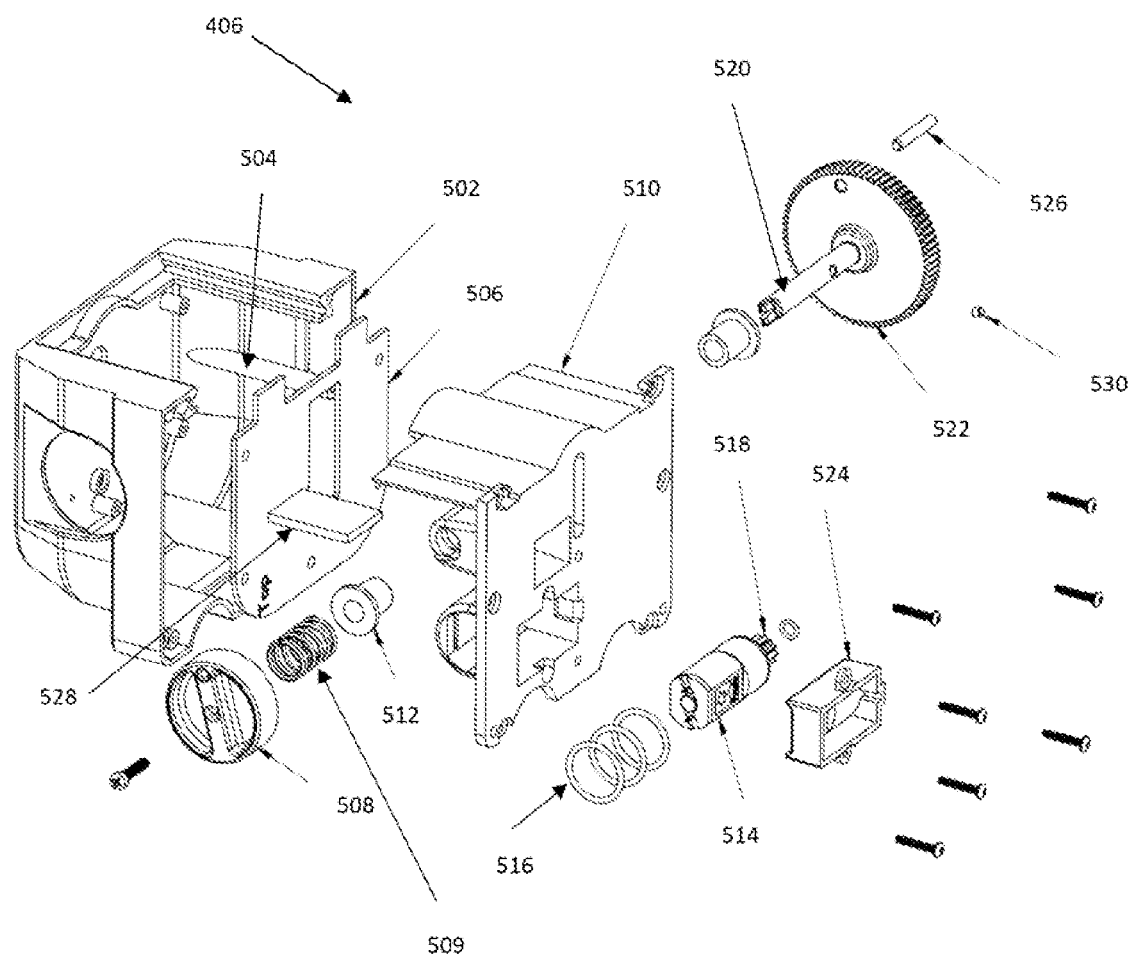
FIG. 5 illustrates a portion of an example damper of FIG. 1.

FIG. 5 illustrates an expanded view of a damper module 406. The damper module 406 includes a housing 502 inside which is disposed a damper printed circuit board 506. An adjustment knob 508 for assisting with installation and removal is coupled to a crank shaft gear 520 via brushing 512. The adjustment knob 508 may further be used for manual actuation in the event of a malfunction. The drive motor 514, coupled to the drive gear 518 which is operationally coupled with the crank gear 522 and actuator pin 526 of the crank gear 522 drives movement in the damper blade assembly 404. A motor holder 510 provides support for the drive motor 514 inside the housing 502 which is sealed by the motor housing cap 524. The "O" rings 516 help isolate sounds transfer from the drive motor 514 to the housing or holder 510. The screw tower 504 holds the housing 510 in place. The spring 509 holds the crank gear in the engaged position to the gear 518 when in a normal state. When compressed, the spring 509 will disengage the crank gear 522 and allow the user to manually position the damper blade 404. This is advantageous to use during installation or removal. In addition, in the event of a loss of power, the user can manually open or close the damper blade 404.

It should be appreciated that the positioning feedback system described above may be any suitable system for determining the position of the damper blade assembly 404. In one example, the positioning feedback system includes a position sensor 528, such as a Hall Effect sensor, which the damper module 406 may use to determine the current position of the damper blade assembly 404. Accordingly, in such an example, the positioning feedback system further includes a position magnet 530 disposed proximate to the crank gear 522 in order for the Hall Effect sensor 528 to be able to determine the current position of the crank gear 522, and in turn the position of the damper blade assembly 404.

Figure 6:
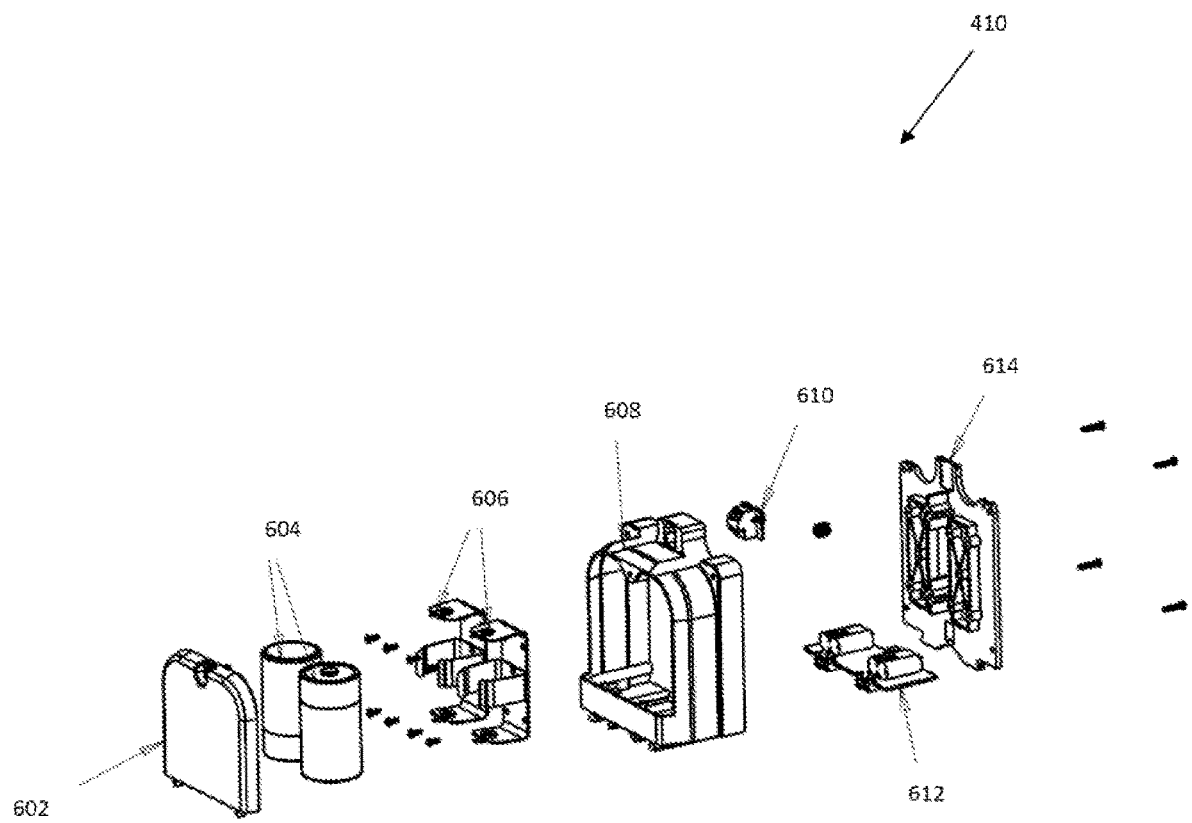
FIG. 6 illustrates a portion of an example damper of FIG. 1.

FIG. 6 illustrates an expanded view of a scavenger module 410. The scavenger module 410 includes a housing 608 to support a battery cell cradle 606. A battery cover 602 secures one or more batteries 604 in the battery cradle 606. The scavenger module 410 further includes a power connector 610. The scavenger module 410 further includes a printed circuit board 612 for facilitating operation of the scavenger module 410. For example, the printed circuit board 612 is configured to receive and store energy harvested from the impeller. The printed circuit board 612 is also configured to manage distribution of power. The printed circuit board 612 is secured to the housing 608 by a cap 614. It should be appreciated that, although the scavenger module 404 is illustrated to include a single printed circuit board 612, the functionality of the printed circuit board 612 may also be separated into two or more printed circuit boards.

Figure 7:
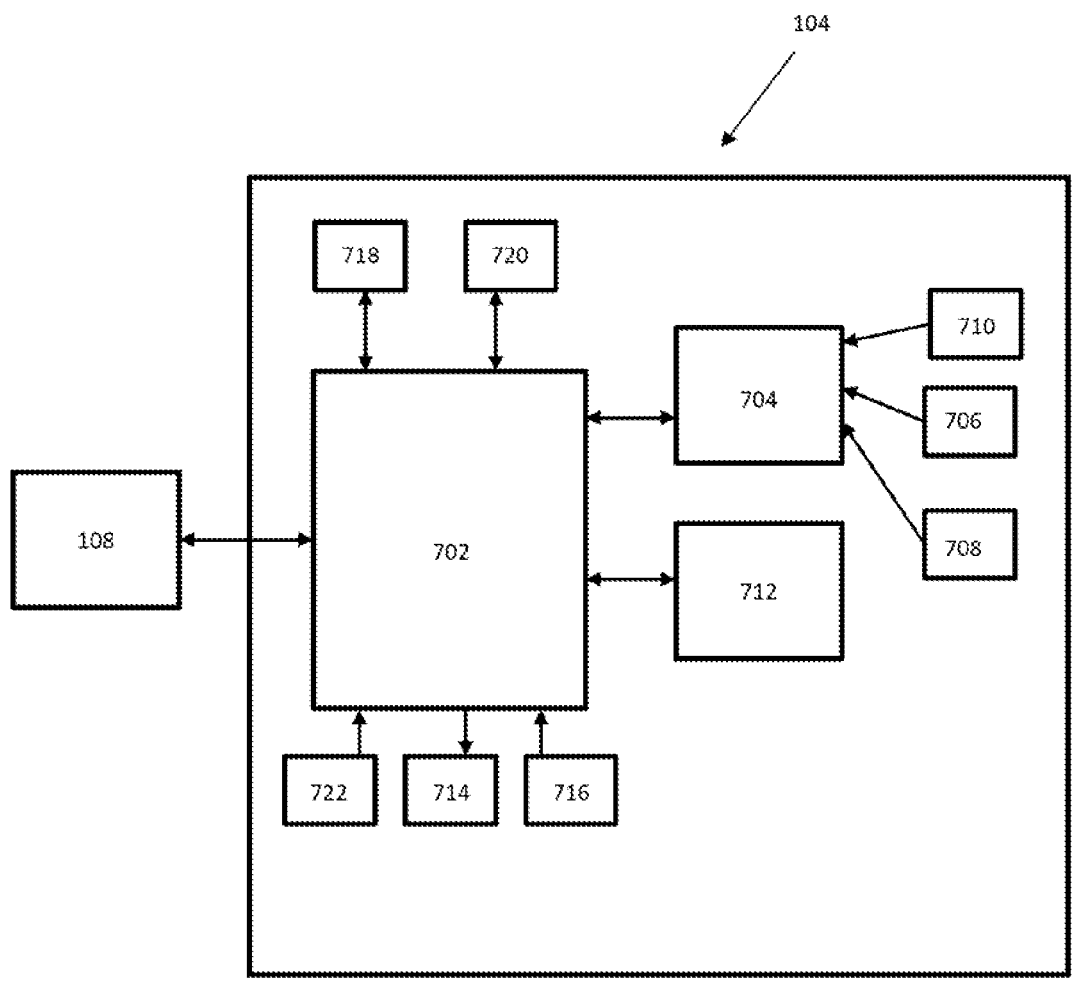
FIG. 7 illustrates a block diagram of an example damper of FIG. 1.

FIG. 7 is a block diagram of the example damper 104 of FIG. 1. The damper 104 includes a microcontroller 702 for facilitating communication and control of the damper 104 with control box 108. In one example, the microcontroller 702 is an 88MZ1000 manufactured by Marvel. In another example, the microcontroller 702 is a BLE 121LR. However, it should be appreciated that any suitable microcontroller can be used. A damper actuator 712 receives control signals from the microcontroller 702 instructing the damper actuator 712 when to open and close the damper in order to allow air to pass by or to block air. In one example, the microcontroller 702 also may receive suitable data from the damper actuator 712. For example, a sensor coupled to the damper actuator 712 may measure torque generated by passing air and communicate the measured data to the microcontroller 702.

In one example, the microcontroller 702 may be configured to detect current spikes while the damper is opening or closing to prevent the damper from actuating when current spikes are detected.

A power management module 704 manages the collection and distribution of power. For example, the power management module 704 is configured to receive power from an energy harvesting device 708 as well as from a rechargeable battery 710. The power management module 704 also distributes power based on either the harvested energy or energy produced by the rechargeable battery to the controller and to the damper actuator 712. In one example, the power management module 704 may further be coupled to and receive power from an AC power supply 706.

The damper 104 includes a pushbutton 722 to enable a contractor or administrator to initiate a communication with the control box 108 that will help identify the damper 104 for configuration purposes. The damper 104 also includes an LED indicator 714 that is configured to blink a corresponding zone color which can further assist a contractor or administrator in configuring the system 100 and setting up zones. In one example, the LED indicator 714 may keep blinking for a predefined time period such as 5 minutes to give the contractor sufficient time to identify the damper 104. In another example, the LED indicator 714 may keep blinking until the pushbutton 712 is again pushed. In one example, a buzzer 716 may provide a contractor with an audible notification which may further assist with identifying the damper 104 during configuration. It should be appreciated that either an audible or a visual notification may be used as needed, or a combination of both. In addition to assisting with configuration, the push button 722, the LED indicator 714, and the buzzer 716 may further assist the contractor when troubleshooting the system 100.

In one example, the damper 104 may further include one or more connectors for coupling to the microcontroller 702 for maintenance, debugging, configuration, and so on. In one example, the damper 104 includes a Joint Test Action Group ("JTAG") connector 718 and a Universal Asynchronous Receiver/Transmitter ("UART") connector 720. In one example, the damper 104 may further include an encoder for converting signals into digital form.

Figure 8:
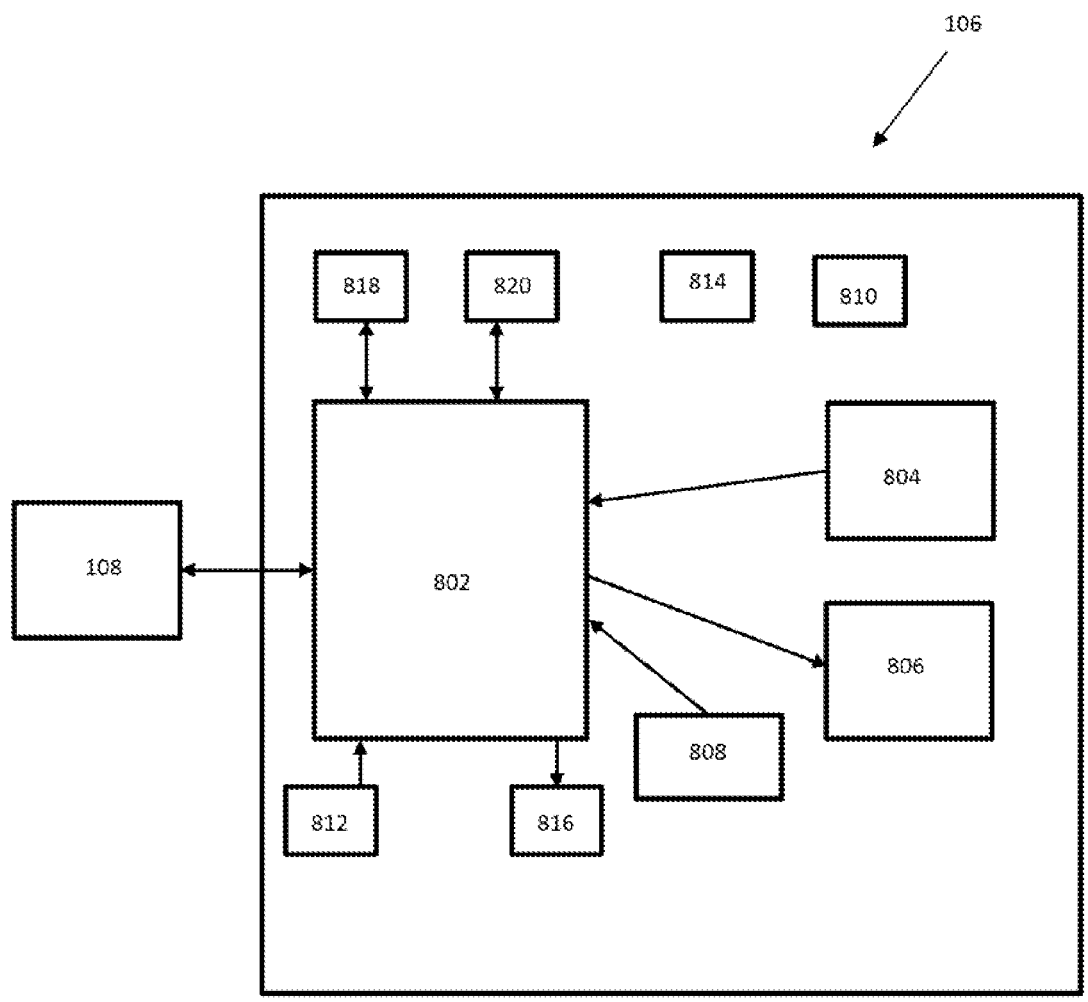
FIG. 8 illustrates a block diagram of an example temperature controller of FIG. 1.

FIG. 8 is a block diagram of an example temperature controller 106 of FIG. 1. The temperature controller 106 includes a microcontroller 802 for facilitating communication and control of the temperature controller 106 with control box 108. In one example, the microcontroller 802 is an 88MZ1000 manufactured by Marvel. In another example, the microcontroller 802 is a BLE 121LR. However, it should be appreciated that any suitable microcontroller can be used. The microcontroller 802 includes a wireless onboard antenna to communicate temperature and humidity data to the control box 108. The microcontroller 802 is further configured to communicate the temperature and humidity information to display 806.

The display 806 is configured to communicate data to a user. For example, the display 806 communicates or displays, in addition to temperature and humidity information, battery level, a temperature set point as desired by a user, a "heating" icon to indicate a heating mode, a "cooling" icon to indicate a cooling mode, and a "fan" icon to indicate a fan mode. In one example, the display 806 also displays the name and icon representative of a room. For example, an icon of a bed displayed may represent a bedroom. In one example, the display 806 is further configured to display an icon or text indicating that a user action is required via the homeowner computing device 120. In one example, the display 806 is further configured to display an energy saving icon, indicating that due to an energy saving plan, a requested set point is not available.

In one example, the temperature controller 106 further includes one or more push buttons for enabling a user to provide input and set a temperature. It should be appreciated that such push buttons may also be provided via the display 806 using a touch screen interface. In one example, the display 806 may be further configured to display a current zone name.

The temperature controller 106 further includes a battery power supply 810 for powering the microcontroller 802. In one example, the battery power supply 810 may be a solar cell. The temperature controller 106 further includes a sensor 808 configured to detect the presence of a person nearby and communicate the information to the microcontroller 802. In one example, the microcontroller 802 is configured to maintain the temperature controller 106 in a sleep mode to conserve the battery power supply 810 until a person is detected nearby, indicating that the person may wish to interact with the temperature controller 106. At that point, the microcontroller 802 "wakes up" the temperature controller 106 and turns on the display 806 in preparation for interaction with the person. In another example, the microcontroller 802 is configured to maintain the display 806 in an active or on state while no person is detected nearby, displaying current room temperature. The microcontroller 802 may be further configured to change the display 806 to communicate a "set temperature screen" when a person is detected as being nearby.

The temperature controller 106 further includes a pushbutton 812 to enable a contractor or administrator to initiate a communication from the temperature controller 106 that will help identify the temperature controller 106 for configuration purposes. In one example, a buzzer 816 may provide a contractor with an audible notification which may further assist with identifying the temperature controller 106 during configuration. In addition to assisting with configuration, the push button 812 and the buzzer 816 may further assist the contractor when troubleshooting the system 100. In one example, LEDs may be included for identification. The LEDs can also be used by a homeowner for location purposes. In one example, the LEDs may briefly or intermittently flash "blue" when cooling and "red" when heating.

The temperature controller 106 further includes one or more connectors for coupling to the microcontroller 802 for maintenance, debugging, configuration, and so on. In one example, the temperature controller 106 includes a Joint Test Action Group ("JTAG") connector 818 and a Universal Asynchronous Receiver/Transmitter ("UART") connector 820.

The temperature controller 106 further includes a "WiFi join" pushbutton 814 that enables the administrator computing device 122 to connect to the control box 108 and enter a router password.

Figure 9:
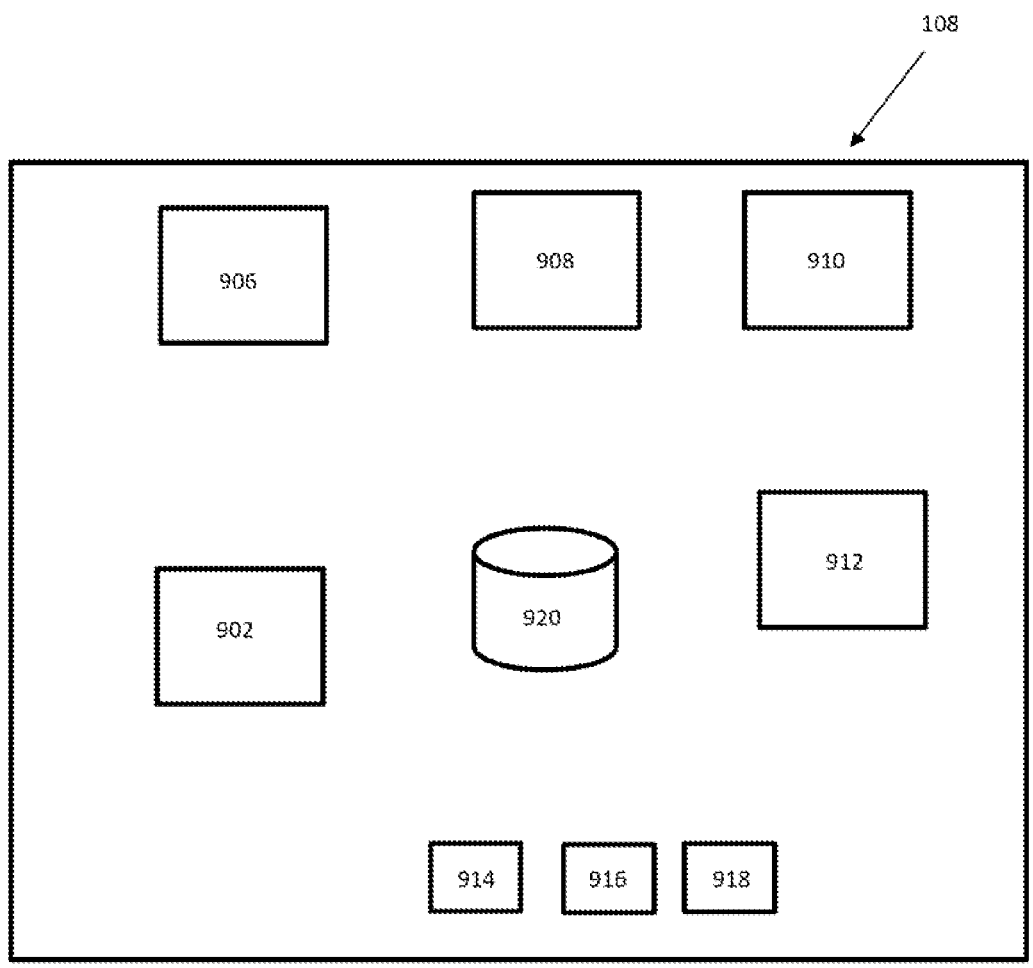
FIG. 9 illustrates a block diagram of and control box of FIG. 1.

FIG. 9 is a block diagram of and control box 108 of FIG. 1. The control box 108 includes a microcontroller 902, including a wireless communication coordinator using a protocol such as ZigBee, Bluetooth or other suitable wireless protocol, for coordinating wireless communications and managing functionality of the system 100. In particular, the microcontroller 902 is configured to receive information from multiple temperature controllers 102 and to provide instructions to associated dampers 104 based on received information. The microcontroller 902 is also configured to provide operating signals to HVAC equipment. Interface connections 906 provide an interface for microcontroller 902 to send and receive data and various suitable inputs and outputs.

The control box 108 further includes an I/O expander 908 to provide additional HVAC output lines if needed. In one example, the I/O expander 908 is a serial to parallel converter. The control box 108 further includes a power source 910. In one example, the power source 910 may be an AC power source. In another example, the power source 910 may include a rechargeable backup battery.

The control box 108 further includes one or more LEDs 912 for assisting a contractor with troubleshooting and configuration. For example, a combination of LEDs 912, using a combination of colors, may provide indications with respect to whether the wireless network is active, whether the control box 108 is connected to the server 124, whether the various sensors are functioning properly, the status of the dampers 104, the status of the temperature controllers 102, and the status of the HVAC equipment 110.

The control box 108 further includes a "WiFi join" pushbutton 914 that enables the administrator computing device 122 to connect to the control box 108 and enter a router password. The control box 108 further includes a "Reset" pushbutton 916 that enables users to restart the control box 108 if necessary. The control box 108 further includes a power source button 918 that enables a contractor to select, upon system setup, between an onboard supplied power source 910 and an external alternate power source.

The control box 108 further includes a settings data store 920 for storing various system 100 settings. For example, microcontroller 902 may receive and store in data store 920 settings received from the administrator computing device 122 in connection with the initial setup of the system 100. The microcontroller 902 may also receive and store in settings data store 920 settings received from the homeowner computing device 120 in connection with user defined preferences. Table 1 lists an example set of parameters that may be received and stored in settings data store 920 as well as a description of the parameter, options for setting the parameter, and example factory default values for the parameters. It should be appreciated that additional suitable parameters may be included as necessary.

TABLE 1

Example System Parameters

| Parameter | Description | Options | Factory Default |
| --- | --- | --- | --- |
| System Name | Accepts a string of characters to be used for identifying the control box and its associated control system. Possible string terminators and illegal characters to be defined. | 16 characters | Test_System |
| Server Update Period | Time period between Wi-Fi based server updates, in seconds | 10-60 Sec | 20 |
| ZigBee Period | Time period of ZigBee/Bluetooth communications for all devices except OA sensor. Impacts battery life and system response time. Time units are seconds. | 1-300 Sec | 5 |
| ZigBee OAT Period | Time period of ZigBee/Bluetooth communications for the outside air temperature sensor (OA sensor). Demo mode sets a period of 5 seconds. Standard operating times are 1, 2, or 3 hours. For app temperature updates, it is suggested to use local weather data rather than the actual OA sensor value, to avoid the perception of a slow sensor. | Demo or 1-3 Hours by integer values | Demo |
| ZigBee Missed Beacon Retries | Number of additional attempts at contacting a ZigBee/Bluetooth mesh node. Impacts power consumption of system. | 3-10 | 3 |
| TC Screen Refresh Period | Time period between temperature controller screen refresh events of the temperature controller, not counting switch interrupt events, in seconds. | 10-60 Sec | 30 |
| Temperature Display | Determines the temperature display units. | Fahrenheit Celsius | Fahrenheit |
| TC Data Display Style | Determines the amount and detail of data to be displayed on temperature controller screen. Simple = Temperature, Battery, and HVAC Equipment status only. Detail = Temperature, Battery, HVAC Equipment status, monthly utility bill associated with HVAC setting. | Simple or Detail | Detail (supports R&D data gathering and troubleshooting) |
| Damper ZigBee Mode Lock | Forces all dampers into ZigBee/Bluetooth Router configuration. This will burn the most battery across the board, but will be useful for the R&D pilot, or to support troubleshooting. ZR Lock = ZigBee/Bluetooth Router Functionality Locked ON, Automatic = ZigBee/Bluetooth router or ZigBee/Bluetooth End Device functionality, depending on scavenging strength and power budget. | ZR Lock or Automatic | ZR Lock (for R&D uses) |
| Priority Mode | Allows specific mode to interrupt active cycle. Priority options include: Automatic, Heating, Cooling, or Zone Weight Priority. Details to found in definitions section to follow. | Automatic Zone Weight Heating Cooling | Automatic |
| Zone 1 Weight | Follow the Zone Weight Calculation (below). | 10-90%, Δ5% | 50% |
| Zone 2 Weight | Follow the Zone Weight Calculation (below). | 10-90%, Δ5% | 50% |
| Zone 3 Weight | Follow the Zone Weight Calculation (below). | 10-90%, Δ5% | 50% |
| Zone 4 Weight | Follow the Zone Weight Calculation (below). | 10-90%, Δ5% | 50% |
| Zone 5 Weight | Follow the Zone Weight Calculation (below). | 10-90%, Δ5% | 50% |

TABLE 1-continued

Example System Parameters

| Parameter | Description | Options | Factory Default |
| --- | --- | --- | --- |
| Zone 6 Weight | Follow the Zone Weight Calculation (below). | 10-90%, Δ5% | 50% |
| Zone 7 Weight | Follow the Zone Weight Calculation (below). | 10-90%, Δ5% | 50% |
| Zone 8 Weight | Follow the Zone Weight Calculation (below). | 10-90%, Δ5% | 50% |
| A.H. Stage-Up Threshold | CFM Stage-up threshold, Y2 output to Air Handler or W2 to FF Furnace engaged when threshold % is reached. Set the percentage of ductwork you would want to be open before the control board will send a Y2 signal to the air handler to increase CFM or W2 signal to furnace to increase output capacity and CFM. | 30-100%, 5% | 50% |
| Heat Stage Threshold | Min leaving air temperature required for comfort at 30 degrees outside air temperature. This set point resets by ½ degree for every 1 degree change in outside air temperature. Sets the minimum supply air temperature in the heating mode. At the factory default the control board will maintain a 100 degrees F. supply air temperature at 30 degrees F. outdoor temperature. The supply air temperature will raise or lower ½ degree F. for every 1 degree F. change in outdoor air temperature. | 80-130 degrees F., 1 degree increments | 100 degrees F. |
| Cool Stage Threshold | Max cooling supply air temp, Y2 is energized if this leaving air temperature is not reached with Y1 output. Sets the maximum supply air temperature allowable before bringing on second stage cooling. Does not reset with the outside air temperature sensor. | 20-60 degrees F., 1 degree increments | 55 degrees F. |
| Balance Point - outside air temperature sensor | Heat pump operates above BP set point and FF furnace operates below set-point. Set the outdoor temperature at which you want to lock the heat pump out and have the fossil fuel back up to take over on a call for heat. This setting is overridden by the "Heat Stage Threshold" function. | 0-50 degrees F., 1 degree increments or "Lock in Backup Heat" for non-heat pump applications | 30 degrees F. |
| Resistance Lockout - outside air temperature sensor | Aux Heat (Electric Resistance Heat) will be locked out when the outside air temperature exceeds this setting. Set the outdoor temperature at which you want to lock out the electric resistance heat. | 0-40 degrees F., or "Lock in Aux" to allow electric aux heat staging regardless of outside air temperature | 30 degrees F. |
| H.P. leaving air temperature Htg. Limit | High limit of heat pump leaving air temperature. Set the maximum allowable supply air temperature in heat pump mode. | 100-125 degrees F., 1 degree F. steps | 120 degree F. |
| Cooling leaving air temperature Low Temp | Cooling leaving air temperature low limit. Set the minimum supply air temperature in the cooling cycle to prevent the coil from freezing. | 34-46 degrees F., 1 degree F. steps | 42 degrees F. |
| Type of Backup Heat | Specify type of Aux "Backup" heat. Select the type of heat that will be initiated when the heat pump can no longer maintain the setting of the heat stage threshold. | Electric or Fossil Fuel | Electric |
| Backup Controls Fan | G output for fossil fuel heat operation True = "W", False = "W", "G". Select true if the backup heat source controls the fan internally or false if the control box needs to initiate the fan. | True or False | True |
| Dehumidifier Call Voltage | Required voltage to energize a dehumidification call. (Note: Leave setting at 24 V when not used.) Set to the dehumidification control voltage output on the dehumidistat control, Y. | 0 Volt or 24 Volt | 24 Volt |
| Secondary Purge Time | End-of-cycle purge time to diffuse residual heating or cooling. Set the amount of time in seconds to run the pump after a cycle to open all dampers. Typically 5 seconds per damper. | 0-180 seconds, 10 second increments | 60 Seconds |
| Dehumidification Cycle Time | Dehumidification "On Cycle" time limit to proven over-cooling of space once cooling set-points are reached (off cycle is fixed at 10 minutes). Set the maximum "ON" time for dehumidification cycle to prevent overcooling of the space. The "OFF" cycle is set at a fixed time of 10 minutes. | 5-15 minutes, 5 minute increments | 10 minutes |
| Cooling Low Ambient Lock-Out | Minimum outside air temperature that mechanical cooling is allowed to operate (locks out Y output). Set the outdoor temperature at which the cooling will no longer come on. | 20-60, 1 degree F. increments | 35 |

TABLE 1-continued

Example System Parameters

| Parameter | Description | Options | Factory Default |
|---|---|---|---|
| Rev Valve Energized | Heat pump rev valve energize in heating or cooling (Zone 1 HP stat always calls "O" for clg call). Set the mode in which the reversing valve is energized. Note: If the heat pump thermostat has a setting for reversing valve in the configuration mode, set the thermostat to energize the reversing valve in cooling. | Cooling or Heating | Cooling |
| Use Balance Point for Electric | Allow Balance Point to be used on all electric system. True heat pump will shut down when ODT is below Balance Point setting. | True or False | False |
| Demo Mode Enable | Demo mode speeds up all HVAC timing sequences by a factor of 12. Used for demonstrations and for initial system commissioning. ZigBee and Wi-Fi time bases are unaffected and remain set by the parameter values. | True or False | False |

It should be appreciated that the control box 108 may include additional components as well, such as solenoids, relays, and a power supply for providing power and/or control air to the various system HVAC elements. For example, relays may be active in the control box 108 to switch electrical power to the HVAC elements. As another example, to provide air from an air handling unit or pump to one of the air dampers 104, the microcontroller 902 activates (via an activation signal) a solenoid to switch air to an air damper 104.

In accordance with one embodiment of the present disclosure, the control box 108 may be accessed by an operator to aid the operator in manually selecting setting options. Such manual selecting includes the steps of powering up the control box 108, displaying a first set of options, selecting at least one of the options from the first set of options, displaying a second set of options, and selecting at least one of the options from the second set of options. The process of displaying a next set of options and selecting from the next set of options may continue until all available selections are made. Also, the homeowner computing device 120 and the administrator computing device 122 may function as an input/output indicator by displaying each thermostat call and the service currently being provided in accordance with an embodiment of the present invention. In one example, the administrator computing device 122 and the homeowner computing device 120 may be used to access the control box 108 and select such settings options.

In one example, control box 108 may further include a USB (universal serial bus) port. The USB port allows a wireless communications device, for example, a tablet computer, to interface to the control box 108. In accordance with an embodiment of the present invention, the control box 108 stores a history of operational data (a data log) which may be read out by a computing device via the USB port. Also, in accordance with an embodiment of the present invention, the USB port may be used to allow the control box 108 to interface with suitable home automation equipment (e.g., a home automation device). The control box 108 is designed with suitable "hooks" or APIs for integration with home automation packages. Data that may be output via the USB port to a home automation package include the multiple events, the current damper states, the current service being provided, the current LAT, the current OA sensor, and any current thermostat or sensor requests. The home automation equipment may include a separate device with software that takes the data provided by the control box 108 and reports the data to a remote user, email, or a web-based interface, for example. The user may have the capability to respond to the report in a similar manner in order to, for example, change the temperature in the home or turn off part of the HVAC system. The interface between the control box 108 and the home automation equipment may be wireless in accordance with various embodiments of the present invention.

Figure 10:
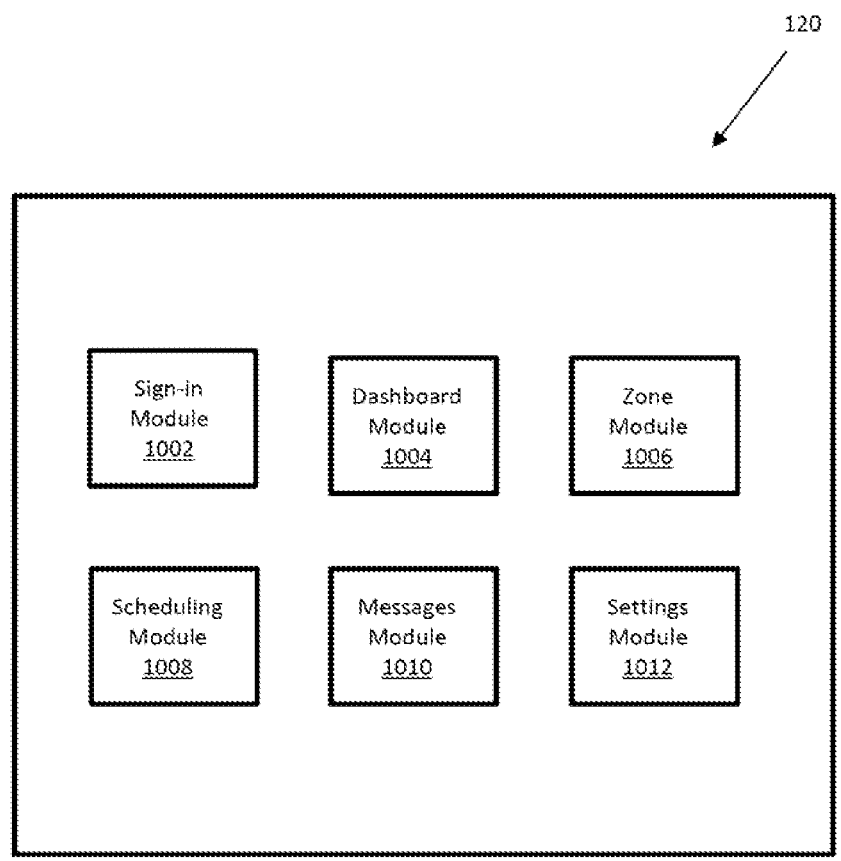
FIG. 10 illustrates a block diagram of an example homeowner computing device of FIG. 1.

Configuration and operation of system 100 may be further appreciated in view of the homeowner computing device 120 and the administrator computing device 122. FIG. 10 illustrates a block diagram of an example homeowner computing device 120 for enabling a homeowner or other user to interface with system 100. Homeowner computing device 120 includes a sign-in module 1002 for enabling a homeowner to sign in to an account or multiple accounts. The sign-in module 1002 also enables a homeowner to sign up for a new account if it's the homeowner's first time using the homeowner computing device 120. As part of the sign-up process, the sign-in module 1002 requires the homeowner to select a wireless home network for accessing the control box 108. It should be appreciated that, although references are made herein with respect to a homeowner, any suitable user with proper access credentials may interface with homeowner computing device 120.

The homeowner computing device 120 further includes a dashboard module 1004. The dashboard module 1004 provides the homeowner with a centralized view of, and access to, the HVAC system for a home. For example, the dashboard module 1004 communicates to the homeowner the current temperature of the home. In one example, the dashboard module 1004 accesses weather through a third party service such as Google or Yahoo. The dashboard module 1004 further communicates to the homeowner a summary of different defined zones of the home. For example, the dashboard module 1004 displays, for each zone, the temperature in that particular zone, whether the zone is currently being heated, cooled, or neither, and whether the zone is locked or unlocked indicating whether the temperature of the zone can be adjusted. The dashboard module 1004 further enables a homeowner to select a specific zone and access more detailed information about the selected zone. The dashboard module 1004 further enables a homeowner to review the currently set heating and cooling schedule and to select a different defined schedule. The dashboard module 1004 further enables the homeowner to select a defined schedule in order to view more details or to make edits. The dashboard module 1004 also provides a homeowner with an option of creating a new schedule.

The homeowner computing device 120 further includes a zone module 1006. In response to a homeowner selecting a zone via the dashboard module 1004, the zone module 1006 communicates an overview of the selected zone to the homeowner. For example, the zone module 1006 displays the temperature of the zone as well as heat and cool set points. In one example, both the heat and cool set points are displayed while the zone mode is set to auto, only the heating set point is displayed when the zone mode is set to heat, and the only the cool set point is displayed when the zone mode is set to cool. In one example, the zone module 1006 is further configured to display a humidity level for a selected zone. In one example, the zone module 1006 is further configured to display a status of the zone. In one example, the zone module 1006 is further configured to display the assigned schedule for the zone. For example, the zone module 1006 may be configured to display "30 minutes until cooling down to 65 F" if the zone is schedule to be cooled down to a temperature of 65 F in 30 minutes. The zone module 1006 also enables a homeowner to return to an overview of all of the zones provided by dashboard module 1004.

In one example, the zone module 1006 enables a homeowner to quickly switch to viewing information about another zone without accessing the dashboard module 1004. For example, the zone module 1006 may enable the homeowner to swipe to the left or right on a touch screen of the homeowner computing device 120 in order to change zone views.

It should be appreciated that "communicating" as used herein may include transmitting data to a display of the homeowner computing device 120 for a homeowner to view. In addition, "communicating" may also include other suitable forms or conveying information, such as audibly, by storing and communicating data electronically, and so on.

In one example, the zone module 1006 enables the homeowner to initiate a "zone hold" which occurs when a homeowner changes the set point to anything other than a set point in the schedule. When a hold occurs, the zone module 1006 changes the status of a zone to default hold. In one example, the default hold is a hold that lasts until the next scheduled profile is assigned. In one example, the zone module 1006 enables a homeowner to change the hold option. For example, the zone module 1006 may enable the homeowner to select one of several hold options including: "hold until next schedule," "hold for an amount of time," where the time is configurable, or "hold indefinitely." In addition, the zone module 1006 may enable the homeowner to cancel the hold and revert back to the selected schedule.

The homeowner computing device 120 further includes a scheduling module 1008 configured to enable a homeowner to select a schedule to run for a zone. The scheduling module 1008 may provide one or more predefined schedules for a homeowner to choose from. For example, the scheduling module 1008 may provide a predefined "primary" schedule which may be a seven-day schedule and may be the most commonly selected schedule. The scheduling module 1008 may further provide a predefined "away" schedule for vacations and business trips, for example. The scheduling module 1008 may also provide a predefined "energy savings schedule" which may include parameters designed to maintain a certain comfort level in a zone while saving energy costs while optimizing energy usage.

The scheduling module 1008 further enables a homeowner to view details about schedules, to edit existing schedules, and to add new schedules. For example, the scheduling module 1008 may enable a homeowner to define specific days associated with a schedule, specific temperatures for certain defined times of the day such as "morning", "away," "arrive home," and "sleep." The scheduling module 1008 enables the homeowner to set different schedules for individual zones or to set a single schedule and apply it to all zones.

The homeowner computing device 120 further includes a messaging module 1010. The messaging module 1010 is configured to communicate various types of messages to a homeowner that may be generated by the system 100. For example, messaging module 1010 may be configured to receive "information" messages which are for information purposes only and require no action. Messaging module 1010 may further be configured to receive "warning" messages which may require troubleshooting by the homeowner. The messaging module 1010 may further be configured to receive "error" messages which may require attention by a contractor. The messaging module 1010 may further be configured to receive "energy tip" messages which may inform the homeowner about potential ways to conserve energy. In one example, such "energy tip" messages may be generated by the computer data server 124 based on historical data. The messaging module 1010 may further be configured to receive "success" messages indicating a contractor's successful visit or system upgrade. It should be appreciated that the messaging module 1010 may be configured to receive other suitable types of messages that may or may not require specific actions by the homeowner or the contractor.

In one example, if a message does not require action including contractor assistance, the messaging module 1010 may be configured to provide the homeowner with an option to delete the message after it is read. In one example, if a message does require action including contractor assistance, the messaging module 1010 may be configured to provide the homeowner with an option to contact the contractor. For example, the messaging module 1010 may provide a homeowner with an option of either calling or emailing the contractor. If the homeowner selects the "call" option, the messaging module 1010 may automatically initiate a telephone call to the contractor. If the homeowner selects the "email" option, the messaging module 1010 may open an email template from the homeowner's default email application and prepopulate the template with information presented in the received message. In one example, the messaging module 1010 may prepopulate the email address with the appropriate email address of a contractor associated with the homeowner's account. In one example, the messaging module 1010 may be configured to automatically contact the contractor, either by email or a telephone call, when a message that requires action including contractor assistance is generated.

The homeowner computing device 120 further includes a settings module 1012 for enabling a homeowner to access and adjust various suitable settings. For example, the settings module 1012 may enable a homeowner to add or delete other users and to grant them access to one or more zones within a location or to all zones within a specific location. In one example the settings module 1012 may enable a homeowner to view and edit contractor information. It should be appreciated that the settings module 1012 may further be configured to enable a homeowner to modify other suitable settings, including, for example, zone names, WiFi configuration, display preferences, access credentials and levels of users, and so on.

Figure 11:
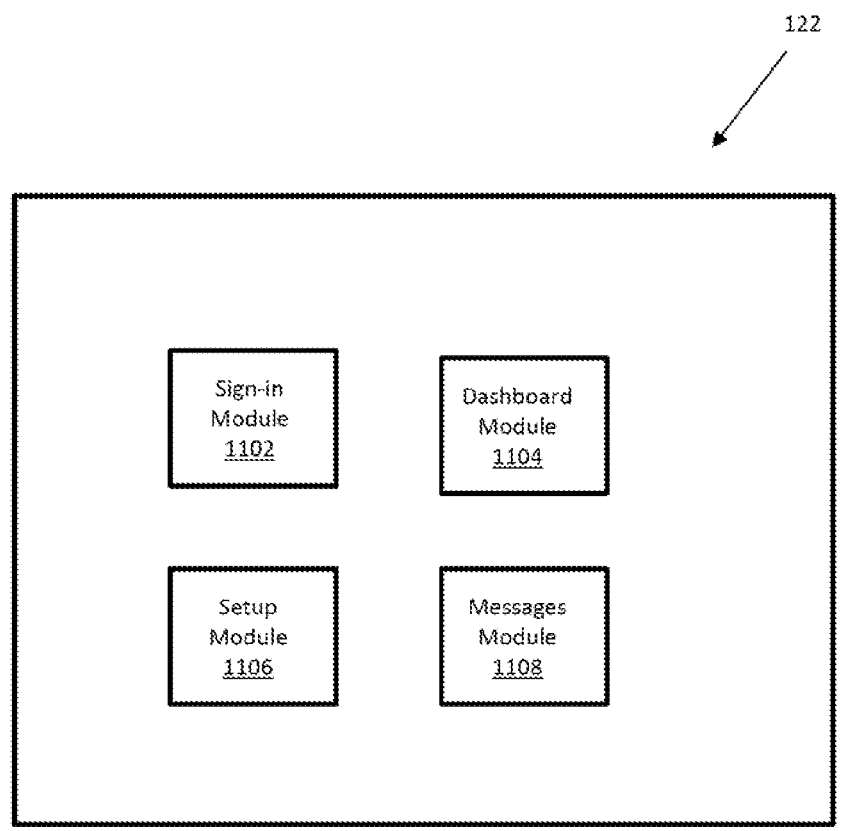
FIG. 11 illustrates a block diagram of an example administrator computing device of FIG. 1.

FIG. 11 illustrates a block diagram of an example administrator computing device 122 for enabling a contractor or other systems administrator to interface with system 100. Administrator computing device 122 includes a sign-in module 1102 configured to receive login credentials from a contractor and to grant access to the system 100 upon successfully validating the received credentials. If the contractor is accessing a system 100 for the first time, the sign-in module 1102 requires provisioning of the system 100. For example, the sign-in module 1102 requires the contractor to select from a list of detected control boxes 108 and to provide an identifier such as serial number, or other suitable information, to ensure that the contractor is accessing the correct control box 108. In one example, the sign-in module 1102 may require the contractor to perform some interaction with the control box 108, such as to push a button or observe a flashing light in order to further ensure that the contractor is accessing the correct control box 1108.

The administrator computing device 122 further includes a dashboard module 1104 for providing information about the system 100 that the contractor can use for maintenance, monitoring, and troubleshooting purposes.

If a contractor is accessing a control box 108 for the first time, a setup module 1106 enables a contractor to set up a system by defining hardware of the system 100 and associating the hardware with different zones. For example, the setup module 1106 may enable a contractor to drag and drop hardware, such as dampers and temperature controllers, from a list of available unassigned hardware and to associate the hardware with specific zones. Thus, zones can be defined in a variety of ways including a single room of a home, multiple rooms, a portion of a room, and so on. In one example, the setup module 1106 enables a contractor to initiate an LED indicator of a selected hardware to flash in order to ensure that the correct hardware is being assigned to a specific zone. In one example, the setup module 1106 enables a contractor to define new zones, edit zones, or delete zones.

The administrator computing device 122 further includes messaging module 1108 configured to enable a contractor to draft and communicate messages to a homeowner about the status of the system 100. In one example, the messaging module 1108 may include one or more predefined messages that the contractor can select from and send to the homeowner.

Figure 12:
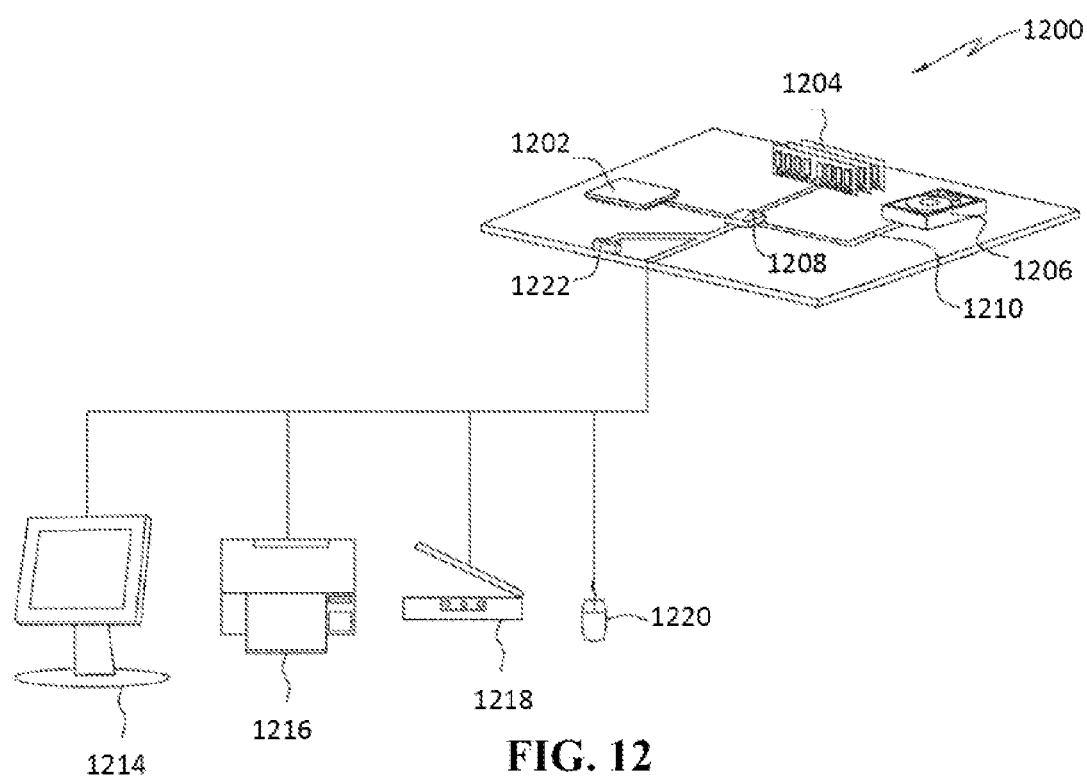
FIG. 12 illustrates a schematic diagram of an example computer for implementing the example homeowner computing device and the administrator computing device of FIG. 1.

FIG. 12 is a schematic diagram of an example computer 1200 for implementing the example homeowner computing device 120 and the administrator computing device 122 of FIG. 1. The example computer 1200 is intended to represent various forms of digital computers, including laptops, desktops, handheld computers, tablet computers, smartphones, servers, and other similar types of computing devices. Computer 1200 includes a processor 1202, memory 1204, a storage device 1206, and a communication port 1208, operably connected by an interface 1222 via a bus 1210.

Processor 1202 processes instructions, via memory 1204, for execution within computer 800. In an example embodiment, multiple processors along with multiple memories may be used.

Memory 1204 may be volatile memory or non-volatile memory. Memory 1204 may be a computer-readable medium, such as a magnetic disk or optical disk. Storage device 1206 may be a computer-readable medium, such as floppy disk devices, a hard disk device, optical disk device, a tape device, a flash memory, phase change memory, or other similar solid state memory device, or an array of devices, including devices in a storage area network of other configurations. A computer program product can be tangibly embodied in a computer readable medium such as memory 1204 or storage device 1206.

Computer 1200 can be coupled to one or more input and output devices such as a display 1214, a printer 1216, a scanner 1218, and a mouse 1220.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the claimed subject matter of the present application has been described with reference to certain embodiments, it will be understood by those skilled in the art that various changes may be made and equivalents may be substituted without departing from the scope of the claimed subject matter. In addition, many modifications may be made to adapt a particular situation or material to the teachings of the claimed subject matter without departing from its scope. For example, any system 100 component described herein could be of either wired or wireless connection, according to various embodiment. Therefore, it is intended that the claimed subject matter not be limited to the particular embodiment disclosed, but that the claimed subject matter will include all embodiments falling within the scope of the appended claims.

What is claimed is:

1. A damper for an HVAC system, comprising:
a base for providing support to the damper and for securing and sealing the damper on an air duct;
a damper blade assembly configured to regulate a flow of air passing through the air duct;
a drive motor comprising a drive gear;
a crank gear and a crankshaft, wherein the crank gear and the crankshaft are connected to each other such that the crank gear and the crank shaft rotate together, the crank gear being operatively coupled to the drive gear of the drive motor;
a rod coupled to the damper blade at a first rod end and coupled to the crank gear at a second rod end, the rod and crank gear configured to rotate the damper blade upon rotation of the crank gear via the drive motor;
a feedback system that includes a crank gear magnet disposed on the crank shaft proximate to the crank gear, the feedback system configured to determine a current position of the damper blade, wherein the crank shaft comprises a recess formed in the crank shaft and the crank gear magnet is disposed in the recess; and
a microcontroller operably coupled to the damper actuator, the microcontroller configured to instruct the damper actuator to open or close the damper blade assembly based on a wireless control signal received by the microcontroller from a remote controller.

2. The damper according to claim 1, further comprising an actuating pin coupling the second rod end to the crank gear.

3. The damper of claim 1, further comprising a printed circuit board, wherein the feedback system comprises a Hall Effect Sensor extending from the printed circuit board.

4. The damper of claim 1, further comprising an adjustment knob operatively coupled to the crank shaft.

5. The damper of claim 4, wherein the crank gear and the crank shaft are contained within a housing and the adjustment knob is accessible outside of the housing.

6. The damper of claim 1, wherein the damper blade is positionable between a fully open state, a fully closed state, and at least one partially opened position that is between the fully open state and the fully closed state, in order to allow apportion of air flow, less than the maximum amount of air flow, to pass through the damper.

7. The damper of claim 1, further comprising at least one O-ring in contact with the drive motor configured to isolate sound transfer from the drive motor to a housing.

8. The damper of claim 1, further comprising:
a scavenger assembly configured to harvest energy from air passing by the damper inside the air duct; and
a scavenger module configured to store energy harvested by the scavenger module.

9. The damper of claim 8, wherein the scavenger module includes a scavenger housing configured to support at least one battery.

10. The damper of claim 8, wherein the scavenger assembly includes an impeller.

11. The damper of claim 1, further including a connector interface configured to electronically couple to a maintenance device.

12. The damper according claim 1, wherein the damper actuator is operably coupled to a sensor configured to measure torque generated by air passing through the air duct, and wherein the damper actuator is configured to communicate measured torque to the microcontroller.

13. The damper according to claim 1, wherein the microcontroller is further configured to detect current spikes, and wherein the microcontroller is configured to prevent the damper actuator from operating based on a detected current spike.

14. The damper according to claim 1, further comprising a printed circuit board, a housing, and a motor holder, wherein:
the printed circuit board, the drive motor, the crank gear, and the crank shaft are contained within housing, and the motor holder is configured to engage the housing and thereby enclose the printed circuit board, the drive motor, the crank gear, and the crank shaft within housing, wherein the motor holder supports the drive motor and the crank shaft.

15. A damper for an HVAC system, comprising:
a damper blade assembly operably coupled to a damper actuator, the damper blade assembly configured to regulate a flow of air passing through an air duct;
a drive motor comprising a drive gear;
a rod having a first rod end and a second rod end, the rod being rotatably coupled to the damper blade at the first rod end;
a crank shaft, wherein the crank gear and the crank shaft are connected to each other such that the crank gear and the crank shaft rotate together;
a crank gear fixed on the crankshaft such that the crank gear and the crank shaft rotate in unison, the crank gear operatively coupled to both the second rod end of the rod and the drive motor, wherein actuation of the drive motor rotates the crank gear in a first direction or a second direction opposite the first direction, wherein rotation of the crank gear positions the damper blade assembly into a fully open position, a fully closed position, or at least one partially opened position that is between the fully open position and the fully closed position relative to the air duct;
a feedback system that includes a crank gear magnet disposed on the crank shaft, the feedback system configured to determine a current position of the damper blade, wherein the crank shaft comprises a recess formed in the crank shaft and the crank gear magnet is disposed in the recess; and
a microcontroller operably coupled to the damper actuator, the microcontroller configured to instruct the damper actuator to open or close the damper blade assembly based on a wireless control signal received by the microcontroller from a remote controller.

16. The damper according to claim 15, wherein the crank gear, the crank shaft, and drive motor are contained within a housing, the rod extending partially into the housing at the second rod end.

17. The damper according to claim 15, further comprising a base for providing support to the damper and for securing and sealing the damper on the air duct.

* * * * *